United States Patent
Ghazvinian Zanjani et al.

(10) Patent No.: US 12,518,470 B2
(45) Date of Patent: Jan. 6, 2026

(54) PLANAR MESH RECONSTRUCTION USING IMAGES FROM MULTIPLE CAMERA POSES

(71) Applicant: QUALCOMM Incorporated, San Diego, CA (US)

(72) Inventors: Farhad Ghazvinian Zanjani, Almere (NL); Leyla Mirvakhabova, Amsterdam (NL); Yinhao Zhu, La Jolla, CA (US); Hong Cai, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 18/509,113

(22) Filed: Nov. 14, 2023

(65) Prior Publication Data
US 2024/0386650 A1 Nov. 21, 2024

Related U.S. Application Data

(60) Provisional application No. 63/502,607, filed on May 16, 2023.

(51) Int. Cl.
| | |
|---|---|
| G06T 15/00 | (2011.01) |
| G06T 7/10 | (2017.01) |
| G06T 7/50 | (2017.01) |
| G06T 15/06 | (2011.01) |
| G06T 15/10 | (2011.01) |
| G06T 17/20 | (2006.01) |

(52) U.S. Cl.
CPC .............. *G06T 15/06* (2013.01); *G06T 7/10* (2017.01); *G06T 7/50* (2017.01); *G06T 15/10* (2013.01);
(Continued)

(58) Field of Classification Search
None
See application file for complete search history.

(56) References Cited

U.S. PATENT DOCUMENTS

| | | | |
|---|---|---|---|
| 11,710,253 B2 * | 7/2023 | Tazoe | G06T 7/246 382/100 |
| 11,948,252 B2 * | 4/2024 | Zangenehpour | G06T 7/12 |

(Continued)

OTHER PUBLICATIONS

International Search Report and Written Opinion—PCT/US2024/028368—ISA/EPO—Aug. 1, 2024.
(Continued)

*Primary Examiner* — Martin Mushambo
(74) *Attorney, Agent, or Firm* — QUALCOMM Incorporated; Espartaco Diaz Hidalgo

(57) ABSTRACT

Systems and techniques are provided for processing image data corresponding to a scene. A process can include generating a planar distance map including a planar distance value for each pixel of at least one image corresponding to the scene. Planar segmentation is performed based on the planar distance map, a normal map corresponding to the at least one image, and positional encoding information of the planar distance map. A triangular mesh fragment is initialized based on sampling points from each planar segment of a plurality of planar segments from the planar segmentation. Ray-triangle intersections are determined based on performing ray casting for a reconstructed planar mesh including a plurality of triangular mesh fragments each corresponding to a different image. A planar reconstruction and segmentation machine learning network is optimized for the scene, based on training the planar reconstruction and segmentation machine learning network using one or more loss functions.

30 Claims, 13 Drawing Sheets

(52) U.S. Cl.
CPC .... *G06T 17/20* (2013.01); *G06T 2207/10016* (2013.01); *G06T 2207/10024* (2013.01); *G06T 2207/20081* (2013.01); *G06T 2207/30244* (2013.01); *G06T 2210/21* (2013.01); *G06T 2210/56* (2013.01)

(56) References Cited

U.S. PATENT DOCUMENTS

| | | | | |
|---|---|---|---|---|
| 2004/0125103 | A1* | 7/2004 | Kaufman | G06T 15/08 345/419 |
| 2011/0267347 | A1* | 11/2011 | Purcell | G06T 15/06 345/426 |
| 2013/0162643 | A1* | 6/2013 | Cardle | B33Y 50/00 345/420 |
| 2013/0194254 | A1* | 8/2013 | Miyoshi | G06T 15/005 345/419 |
| 2018/0302536 | A1* | 10/2018 | Kaneko | H04N 9/3182 |
| 2019/0057539 | A1* | 2/2019 | Stanard | B29C 63/36 |
| 2020/0372710 | A1* | 11/2020 | Wang | G06T 15/005 |
| 2021/0142577 | A1* | 5/2021 | Thomas | G06V 20/647 |
| 2023/0032888 | A1* | 2/2023 | Li | G06V 10/44 |

OTHER PUBLICATIONS

Liu C., et al., "PlaneNet: Piece-Wise Planar Reconstruction from a Single RGB Image", 2018 IEEE/CVF Conference on Computer Vision and Pattern Recognition, Jun. 18, 2018, pp. 2579-2588, XP033476224, abstract section 3 figure 2.

Popovic N., et al., "Neural Radiance Fields for Manhattan Scenes with Unknown Manhattan Frame", arxiv.org, Cornell University Library, 201 Olin Library Cornell University Ithaca, NY 14853, Apr. 14, 2023, 18 Pages, XP091484154, abstract, sections 3, 4, 4.1, figures 1, 2.

Prinzler M., et al., "DINER: Depth-aware Image-based NEural Radiance fields", arxiv.org, Cornell University Library, 201 Olin Library Cornell University Ithaca, NY 14853, Mar. 30, 2023, XP091472584, pp. 1-15, abstract figure 2.

Wang., et al., "NeuRIS: Neural Reconstruction of Indoor Scenes Using Normal Priors", 17th European Conference, Tel Aviv, Israel, Oct. 23-27, 2022, Proceedings, Part XXXII" In: "European Conference on Computer Vision", Springer Berlin Heidelberg, Copenhagen, Denmark, pp. 1-17, XP093187809, ISSN: 0302-9743 vol. 13692, pp. 139-155, DOI: 10.1007/978-3-031-19824-3_9, abstract, sections 1, 3, 3.1 figures 1, 2.

Xie Y., et al., "PlanarRecon: Realtime 3D Plane Detection and Reconstruction from Posed Monocular Videos", 2022 IEEE/CVF Conference on Computer Vision and Pattern Recognition (Cvpr), Jun. 18, 2022, pp. 6209-6218, XP034194607, DOI: 10.1109/CVPR52688.2022.00612, abstract sections 2, 3, 3.1 figure 2.

Zanjani F G., et al., "Neural Mesh Fusion: Unsupervised 3D Planar Surface Understanding", arXiv.org, Feb. 26, 2024, XP093187446, pp. 1-7, DOI: 10.48550/arxiv.2402.16739, the whole document.

Zhang M., et al., "Structural Multiplane Image: Bridging Neural View Synthesis and 3D Reconstruction", arxiv.org, Cornell University Library, 201 Olin Library Cornell University Ithaca, NY 14853, Mar. 10, 2023, 10 Pages, XP091458783, abstract, sections 4, 4.1 figure 3.

\* cited by examiner

Input image · Plane-aware triangulation · 3D mesh fragment

Ray sampling for contrastive learning

PLANAR MESH RECONSTRUCTION USING IMAGES FROM MULTIPLE CAMERA POSES

CROSS-REFERENCE TO RELATED APPLICATIONS

This application claims priority to U.S. Provisional Patent Application No. 63/502,607, filed May 16, 2023, which is hereby incorporated by reference, in its entirety and for all purposes.

FIELD

The present disclosure generally relates to planar reconstruction using meshes. For example, aspects of the present disclosure relate to systems and techniques for performing three-dimensional (3D) planar reconstruction using optimization of surface meshes.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

According to at least one illustrative example, a method for processing image data corresponding to a scene is provided. The method includes: obtaining at least one image corresponding to the scene; generating a planar distance map corresponding to the at least one image, wherein the planar distance map includes a planar distance value for each pixel of a plurality of pixels of the at least one image; performing planar segmentation based on the planar distance map, a normal map corresponding to the at least one image, and positional encoding information associated with the planar distance map; initializing a triangular mesh fragment at least in part by sampling one or more points from each planar segment of a plurality of planar segments determined based on the planar segmentation; and determining one or more ray-triangle intersections based on performing ray casting for a reconstructed planar mesh using a trained planar reconstruction and segmentation machine learning network, wherein the reconstructed planar mesh includes a plurality of triangular mesh fragments, each triangular mesh fragment corresponding to a different image.

In another illustrative example, an apparatus configured to process one or more images corresponding to a scene is provided. The apparatus includes one or more memories configured to store the one or more images and one or more processors coupled to the one or more memories, the one or more processors being configured to: obtain at least one image of the one or more images, wherein the at least one image corresponds to the scene; generate a planar distance map corresponding to the at least one image, wherein the planar distance map includes a planar distance value for each pixel of a plurality of pixels of the at least one image; perform planar segmentation based on the planar distance map, a normal map corresponding to the at least one image, and positional encoding information associated with the planar distance map; sample one or more points from each planar segment of a plurality of planar segments to initialize a triangular mesh fragment, wherein the plurality of planar segments are determined based on the planar segmentation; and perform ray casting for a reconstructed planar mesh, based on a trained planar reconstruction and segmentation machine learning network, to determine one or more ray-triangle intersections based on the ray casting, wherein the reconstructed planar mesh includes a plurality of triangular mesh fragments, each triangular mesh fragment corresponding to a different image.

In another illustrative example, a non-transitory computer-readable storage medium is provided comprising instructions stored thereon which, when executed by at least one processor, causes the at least one processor to: obtain at least one image of one or more images, wherein the at least one image corresponds to a scene; generate a planar distance map corresponding to the at least one image, wherein the planar distance map includes a planar distance value for each pixel of a plurality of pixels of the at least one image; perform planar segmentation based on the planar distance map, a normal map corresponding to the at least one image, and positional encoding information associated with the planar distance map; sample one or more points from each planar segment of a plurality of planar segments to initialize a triangular mesh fragment, wherein the plurality of planar segments are determined based on the planar segmentation; and perform ray casting for a reconstructed planar mesh, based on a trained planar reconstruction and segmentation machine learning network, to determine one or more ray-triangle intersections based on the ray casting, wherein the reconstructed planar mesh includes a plurality of triangular mesh fragments, each triangular mesh fragment corresponding to a different image.

In another illustrative example, an apparatus is provided for processing image data corresponding to a scene. The apparatus includes: means for obtaining at least one image corresponding to the scene; means for generating a planar distance map corresponding to the at least one image, wherein the planar distance map includes a planar distance value for each pixel of a plurality of pixels of the at least one image; means for performing planar segmentation based on the planar distance map, a normal map corresponding to the at least one image, and positional encoding information associated with the planar distance map; means for initializing a triangular mesh fragment at least in part by sampling one or more points from each planar segment of a plurality of planar segments determined based on the planar segmentation; and means for determining one or more ray-triangle intersections based on performing ray casting for a reconstructed planar mesh, using a trained planar reconstruction and segmentation machine learning network, wherein the reconstructed planar mesh includes a plurality of triangular mesh fragments, each triangular mesh fragment corresponding to a different image; and means for optimizing a planar reconstruction and segmentation machine learning network for the scene, based on training the planar reconstruction and segmentation machine learning network using one or more loss functions.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
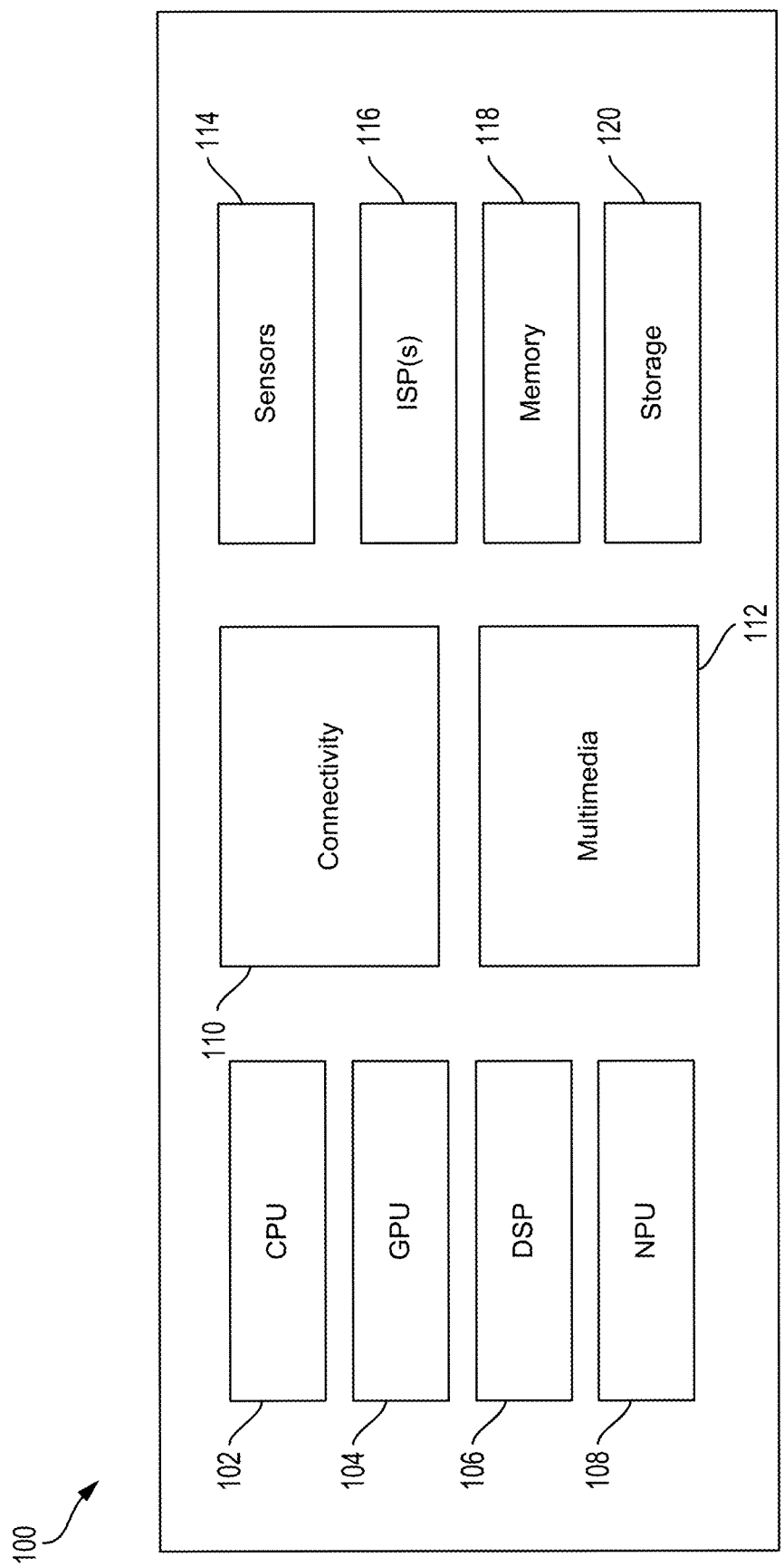
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted above, machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can be used to perform planar reconstruction of a scene, for example based on reconstructed 3D geometry with visual contents from image collections. For instance, in three-dimensional (3D) planar reconstruction of a scene, a 3D mesh of object surfaces is created using planes as geometric primitives. 3D planar reconstruction can also be referred to herein as "3D reconstruction." The 3D mesh can correspond to object surfaces within the analyzed scene (e.g., a scene or environment depicted in image and/or video data provided as input to the 3D planar reconstruction. In some examples, a video data input for 3D planar reconstruction can be posed monocular video. Image data inputs can include a plurality of images captured with different camera locations and/or poses. For instance, the plurality of images can be a sequence of color images obtained from a monocular moving camera. In some cases, the plurality of images may be video data frames (e.g., frames of posed monocular video, etc.).

A reconstructed 3D mesh of a scene can be used for many applications (e.g., augmented reality (AR) applications, virtual reality (VR) applications, mixed reality (MR) applications, extended reality (XR) applications, vehicle applications, etc.). A reconstructed 3D mesh can additionally be used for applications such as robotic or autonomous navigation, interior 3D modeling, etc. For instance, abstracting the geometrical details of the scene with a set of representative planar primitives can be used to provide compact representation of information that may be needed for applications and interactions with and/or within the physical spaces represented by a reconstructed 3D mesh of a scene. In some examples, a 3D mesh of a scene can be used to provide a corresponding dense spatial map of the scene and/or to generate sparse 3D point clouds. 3D meshes can additionally be used to perform planar image tracking (e.g., recognizing and tracking planar images).

3D reconstruction and/or 3D meshes can be used to generate three-dimensional content (e.g., such as XR content) with greater accuracy. For instance, a 3D mesh generated using 3D reconstruction can be used to generate XR content that combines a baseline image or video with one or more augmented overlays of rendered 3D objects. The baseline image data (e.g., an image or a frame of video) that is augmented or overlaid by an XR system may be a two-dimensional (2D) representation of a 3D scene. A naïve approach to generating XR content may be to overlay a rendered object onto the baseline image data, without compensating for 3D depth information that may be represented in the 2D baseline image data. The 3D mesh generated using 3D planar reconstruction can be used to determine accurate 3D depth information to more accurately perform object placement for one or more virtual objects that are placed and anchored onto planar surfaces, and to improve the realism of the XR scene. In navigation applications and examples, 3D meshes of an environment can be used to identify one or more planar surfaces that can be used (e.g., by an XR or AR navigation application) to highlight a path to take based on the flat surfaces available in the environment. In another example, a 3D mesh generated using 3D planar reconstruction can be used to implement an XR gaming application, where the XR game is designed to take place on a virtual table with objects appearing to interact with the real-world surface (e.g., rendered based on a 3D mesh of the surrounding scene or environment).

In some 3D reconstruction techniques, 3D implicit geometric representation by a neural network is used, and may be referred to as Neural Radiance Fields (NeRFs). For example, in a NeRF-based approach, a volumetric representation of the scene is learned, and radiance can be calculated based on performing ray marching through an encoded light field. However, planar surface reconstruction by surface-based regularization is a non-trivial and computationally complex process, as the surfaces are implicitly defined. For instance, surface-based and volume-based rendering approaches may utilize implicit differentiation to determine gradients for optimizing underlying implicit surfaces. Surface-based rendering techniques may assume an object segmentation mask is given for each input image, and may further assume that each ray intersects a surface no more than one time. Surface-based rendering techniques may have poor generalization to scene reconstruction, and may be limited to performing object reconstruction.

In some volume-based rendering techniques, object segmentation masks are not needed. For example, some volume-based techniques may be based on performing ray marching within the volume to predict density and radiance fields, and representing the geometry as a density field where the surface of the shape can be determined based on iso-surfacing. In some instances, volume-based rendering techniques may jointly model surface information and appearance information using neural representation. However, such implicit representations rely on various ray marching techniques, which are computationally expensive during both training and inference. Additionally, when ray marching techniques are needed, additional steps can be required to extract surfaces which are not differentiable. Planar reconstruction based on ray marching techniques may require multiple post-processing stages, including an iso-surfacing post-processing stage and a planar surface detection stage.

In some deep-learning based approaches, 3D planar surface reconstruction may be performed as a supervised learning problem, requiring 2D plane annotations and/or 3D plane annotations (e.g., some deep-learning approaches may utilize large-scale plane annotations to simplify the formulation of planar reconstruction). However, it can be time-consuming to generate the corresponding 2D and/or 3D plane annotations. Additionally, once the test data has a distribution shift (e.g., relative to the training data), the performance of the deep-learning based approach can degrade.

There is a need for systems and techniques that can be used to more efficiently perform 3D planar reconstruction.

There is a further need for systems and techniques that can be used to perform 3D planar reconstruction without utilizing ray marching. There is also a need for systems and techniques that can be used to perform unsupervised 3D planar reconstruction. There is also a further need for systems and techniques that can perform unsupervised planar reconstruction using a multi-view geometry constraint to optimize on various unseen scenes with different imaging sensors.

Systems, apparatuses, processes (also referred to as methods), and computer-readable media (collectively referred to as "systems and techniques") are described herein for planar reconstruction using meshes. For example, the systems and techniques can be used to perform 3D planar reconstruction of a scene based on image data from a monocular moving camera. In one illustrative example, the 3D planar reconstruction is unsupervised. For instance, the systems and techniques can perform unsupervised 3D planar reconstruction of a scene based on a joint optimization of topology determined from multi-view image observations and unsupervised planar-surface parsing of the scene. In some aspects, the systems and techniques can perform the 3D planar reconstruction by directly deforming surface meshes. For instance, the systems and techniques can directly deform surface meshes, without utilizing implicit representations encoded in one or more neural networks and/or without explicitly deforming a dense volumetric tetrahedral mesh. In one illustrative example, differentiable rendering and monocular geometric prediction can be used to generate a compact triangular surface mesh representations. In some aspects, the systems and techniques perform gradient-based optimization directly on the surface mesh. For instance, the systems and techniques can perform optimization of the surface mesh (e.g., directly on the surface mesh) using a gradient-descent algorithm to find a corresponding local minimum of a differentiable function associated with the surface mesh and/or for training one or more machine learning networks used to generate the surface mesh.

In some aspects, the systems and techniques can perform the unsupervised planar-surface parsing of the scene based on performing a differentiable planar parsing of a predicted surface mesh without 2D or 3D plane labels. In one illustrative example, instead of deforming an initial volumetric mesh, the systems and techniques can perform neural mesh fusion (NMF) to learn a fusion of planar meshes by explicit neural rendering. For instance, a plurality of planar meshes can be generated based on image data of a scene (e.g., image data from a monocular moving camera, where the image data includes images associated with different camera locations and/or different camera poses).

Each respective planar mesh can correspond to a planar surface predicted from the 2D image inputs. Each respective planar mesh can be represented as a 3D triangular mesh. The vertices of the mesh can be positioned in the 3D space based on one or more predicted depth values. In some aspects, the one or more predicted depth values can be referred to as pseudo-depth values, and can be determined based on providing the 2D image input to a depth prediction machine learning network. In some cases, the vertices of the mesh can be initially positioned in 3D space based on the predicted depth values determined from the 2D image input. In one illustrative example, the position(s) of the vertices of the mesh can be optimized using a multilayer perceptron (MLP) machine learning network. For instance, the MLP network can optimize the position of vertices of the 3D mesh using alpha-composition with explicit neural rendering. In some aspects, the MLP network can assign a unique label to all vertices that are included in or otherwise corresponding to a representative planar surface in the mesh. For instance, the MLP network can label the vertices with representative planar surfaces in the mesh by maximizing the label assignments between predicted labels and 2D labels generated based on unsupervised plane segmentation from the 2D image input.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include one or more sensors 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding the output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
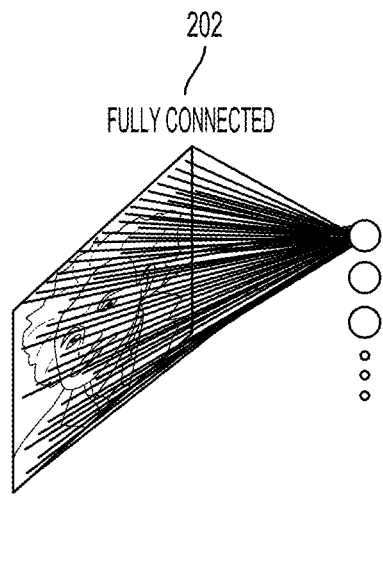
FIG. 2A illustrates an example of a fully connected neural network, in accordance with some examples.
Figure 2B:
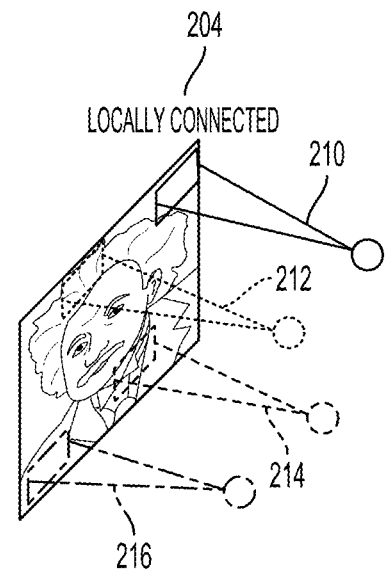
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
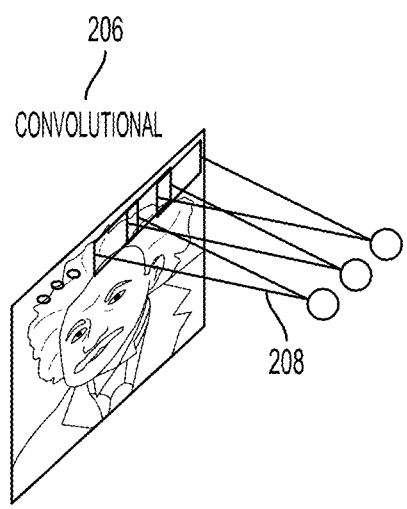
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 13. An illustrative example of a convolutional neural network is described in greater depth with respect to the example block diagram of FIG. 14.

As mentioned previously, the systems and techniques described herein can be used to perform planar reconstruction using meshes. For instance, the systems and techniques can be used to perform 3D planar reconstruction based on generating 3D meshes corresponding to one or more 2D images of a scene. In some aspects, the one or more 2D images of a scene can be obtained as image data captured by a monocular moving camera. For example, the one or more 2D images of the scene can be a sequence of color images captured by a monocular moving camera.

Figure 3:
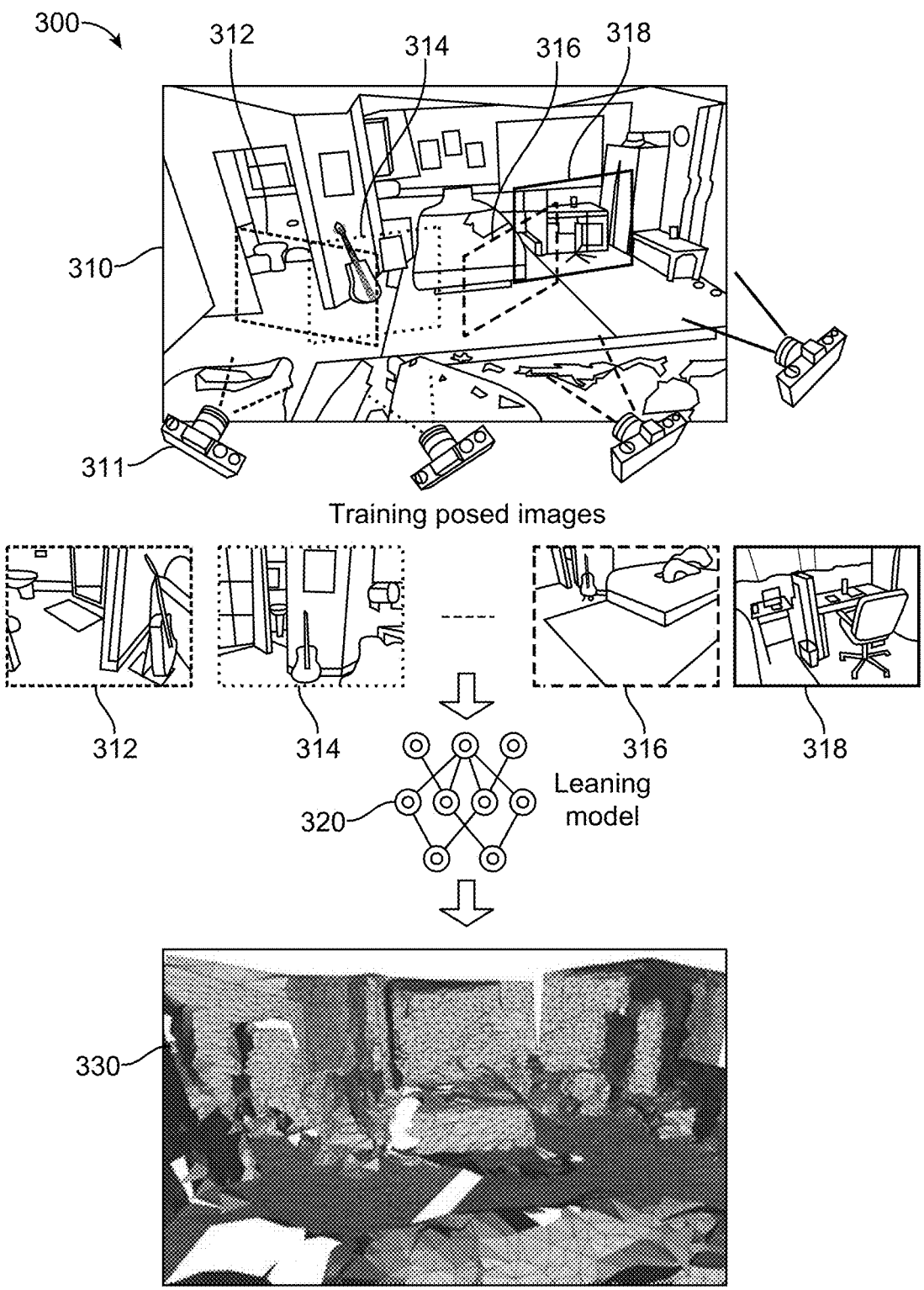
FIG. 3 illustrates an example of three-dimensional (3D) planar reconstruction of a scene using multiple training posed images, in accordance with some examples.

FIG. 3 illustrates an example of three-dimensional (3D) planar reconstruction 300 of a scene using multiple training posed images, in accordance with some examples. As used herein, a scene can refer to an environment, area, location, etc., that is represented in or by the one or more 2D image inputs. For instance, the scene 310 depicted in FIG. 3 is an indoor scene corresponding to an interior room of a house or building. A plurality of images 312, 314, 316, 318 can be captured by a monocular moving camera 311. For example, a first image 312 can be captured from a first location of the monocular moving camera 311 and corresponds to a first portion of the scene 310; a second image 314 can be captured from a second location of the monocular moving camera 311 and corresponds to a second portion of the scene 310; a third image 316 can be captured from a third location of the monocular moving camera 311 and corresponds to a third portion of the scene 310; a fourth image 318 can be captured from a fourth location of the monocular moving camera 311 and corresponds to a fourth portion of the scene 310; etc.

In some aspects, each of the images 312-318 corresponds to a different view of the scene 310 and additionally corresponds to a different pose of the monocular moving camera 311. Each of the images 312-318 can be a color image. The pose of the monocular moving camera 311 (e.g., the camera pose associated with or corresponding to each of the images 312-318) can also be referred to as extrinsic information of the camera and/or can be include in extrinsic information of the monocular moving camera 311. In some aspects, intrinsic information or parameters of the monocular moving camera 311 can additionally be utilized and/or associated with the images 312-318 (e.g., focal length, sensor size, sensor location or origin coordinate, etc.).

In one illustrative example, a learning model 320 can receive some (or all) of the images 312-318 as input. The learning model 320 can additionally receive the extrinsic information and/or the intrinsic information associated with monocular moving camera 311 as input. In some aspects, learning model 320 can be the same as or similar to the example machine learning architecture 400 of FIG. 4 and may be used to implement the Neural Mesh Fusion (NMF) described herein.

In some cases, the input images provided to learning model 320 (e.g., images 312-318) can be a subset of a plurality of images captured using monocular moving camera 311, for example as will be described in greater detail with respect to FIG. 5, below. Based on the 2D input images 312-318 and the extrinsic and/or intrinsic information of monocular moving camera 311, the learning model 320 can generate a 3D planar reconstruction 330 corresponding to the scene 310. For example, the learning model 320 can generate 3D planar reconstruction 330 based on performing 3D geometry learning to generate 3D meshes corresponding to planar surfaces within the scene 310 and depicted within the 2D input images 312-318. The learning model 320 can additionally perform planar segmentation to label each vertex of a plurality of vertices included in the 3D mesh with information indicative of a particular plane instance that includes each respective vertex of the 3D mesh, as will be described in greater depth below.

Figure 4:
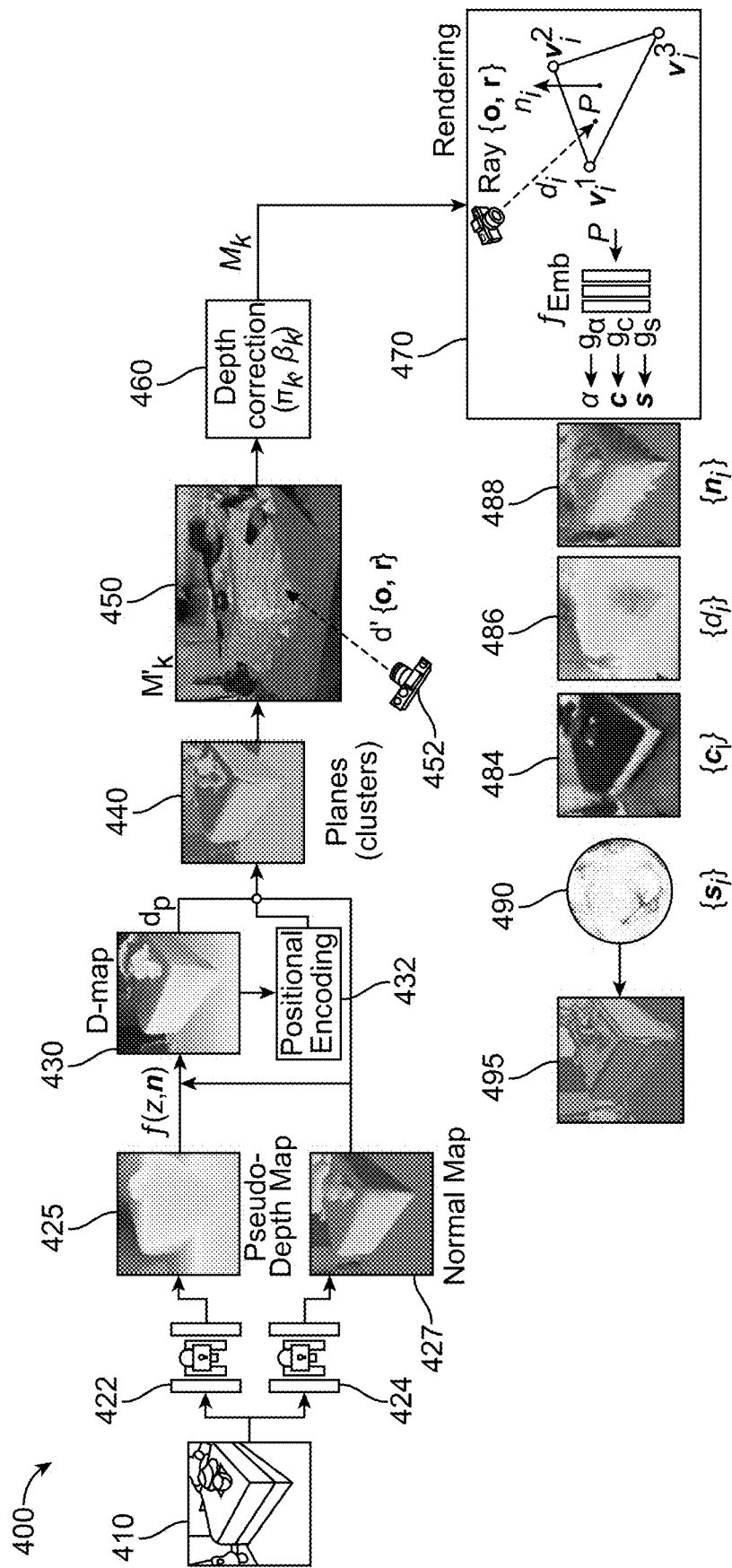
FIG. 4 illustrates an example block diagram of an architecture for implementing neural mesh fusion for planar scene reconstruction from multi-view posed images, in accordance with some examples.

FIG. 4 illustrates an example block diagram of a machine learning architecture 400 for implementing neural mesh fusion (NMF) for planar scene reconstruction based on multi-view posed images, in accordance with some examples. In some aspects, the machine learning architecture 400 can be the same as or similar to the learning model 320 of FIG. 3. A 2D input image 410 can be a 2D color image obtained using a monocular moving camera (e.g., such as the monocular moving camera 311 of FIG. 3). The 2D input image 410 can be the same as or similar to one or more of the 2D input images 312, 314, 316, and/or 318 of FIG. 3. In some cases, 2D input image 410 can be included in a subset (or cluster) of images captured by a monocular moving camera, and for instance may be included in one of the clusters 532, 534, or 536 (also referred to as subsets) depicted in FIG. 5.

Figure 5:
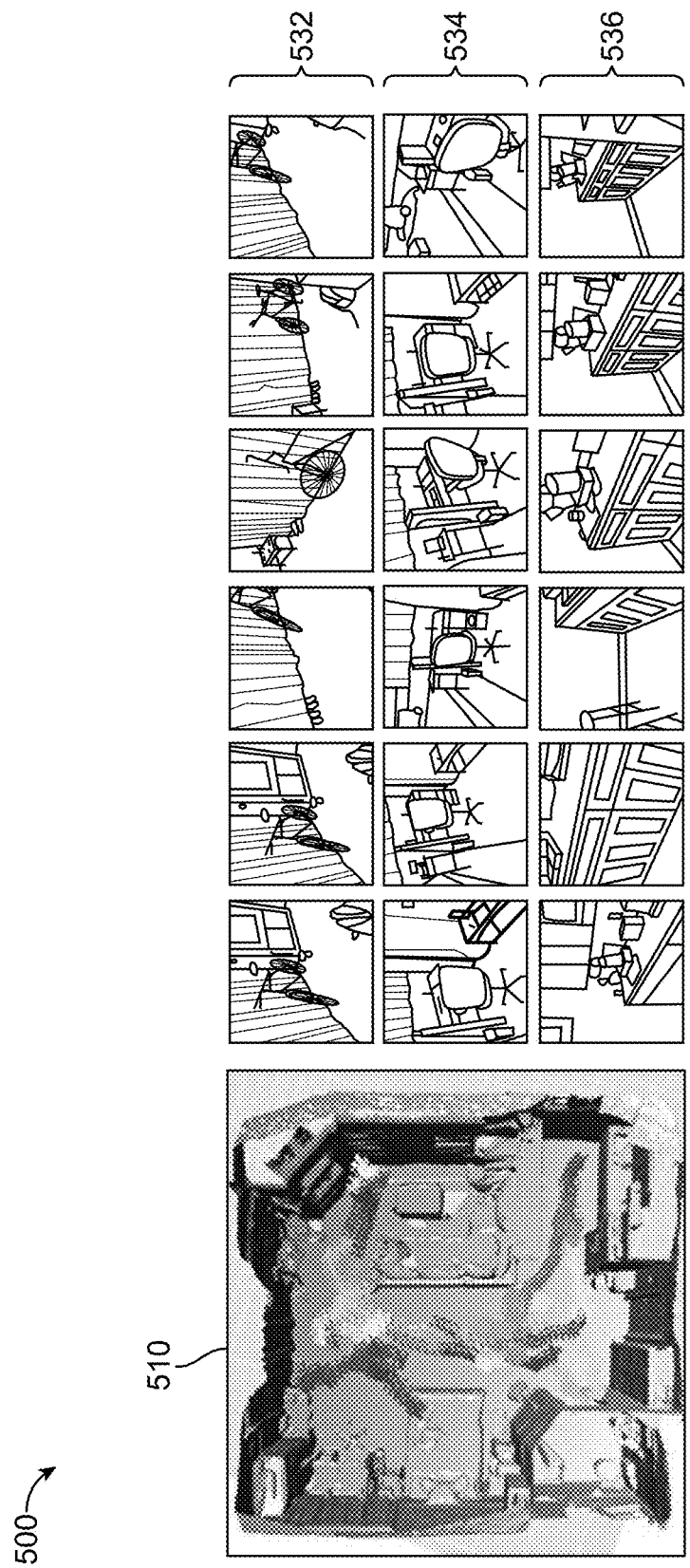
FIG. 5 depicts examples of clustered training samples based on three-dimensional (3D) intersection-over-union (IoU) of view frustrum, and examples batches of images from different clusters, in accordance with some examples.

FIG. 5 depicts an example of multi-view image sampling 500 that can be performed to cluster a plurality of multi-view images (e.g., a plurality of images depicting multiple views of a scene by a camera (e.g., monocular moving camera)). In one illustrative example, the plurality of multi-view images can be clustered based on determining 3D intersection-over-union (IoU) information corresponding to a respective view frustrum of each image of the plurality of multi-view images. The plurality of multi-view images can be clustered into a plurality of different clusters 510, where each cluster of images is associated with a similar view of the scene (e.g., similar and/or overlapping view frustrums). The view frustrum of a particular image can correspond to a field of view (FOV) associated with the particular image (e.g., a FOV of the monocular moving camera when capturing the particular image). The view frustrum of each image can be determined based on camera pose information and/or additional extrinsic and/or intrinsic information of the camera used to capture the particular image.

Images included in the same cluster can depict a similar spatial view (e.g., view frustrum) of the three-dimensional space of the scene. For example, images of a first cluster 532 depict similar spatial views of a first three-dimensional space of the scene that includes a bicycle leaning against a curtain. Images of a second cluster 534 depict similar spatial views of a second three-dimensional space of the scene that includes a desk and a chair. Images of a third cluster 536 depict similar spatial views of a third three-dimensional space of the scene that includes a cabinet and countertop.

In one illustrative example, the multi-view image sampling 500 (also referred to as multi-view clustering) can be used to perform multi-view image sampling to obtain the 2D input image 410 of FIG. 4 as a selection from a particular subset of the plurality of subsets of clustered images (e.g., as a selection from one of the clusters 532, 534, or 536 of FIG. 5). In some aspects, the 2D input image 410 of FIG. 4 can be obtained based on performing wide-baseline view sampling from the clusters of images clustered based on 3D IoU for the view frustrums of the images. For instance, multi-view image sampling can be performed for each training batch, where a training batch includes various different views of the objects in the scenes. Based on the multi-view sampling across the different image clusters (e.g., clusters 532, 534, 536), rich 3D information can be obtained. In some examples, the multi-view sampling can be implemented based on partitioning a plurality of training images (e.g., 2D images captured using a monocular moving camera) into a quantity, M, of subsets based on the respective 3D view frustrum of each training image. In some cases, the partitioning can be performed based on defining a near and far planar view for the 3D frustrum. Based on the near and far planar views for the 3D frustrum, the pairwise 3D IoU can be determined for all samples (e.g., all training images of the plurality of training images captured using the monocular moving camera). Clustering can be performed based on the pairwise IoU similarity. In one illustrative example, clustering can be performed using spectral clustering.

In some aspects, the machine learning architecture 400 of FIG. 4 (e.g., also referred to as a Neural Mesh Fusion (NMF) network, as noted previously above) can be trained using at least one image from each cluster of a plurality of clusters determined based on the pairwise IoU similarity spectral clustering. For instance, the NMF network 400 can be trained using one or more images from the first cluster 532, one or more images from the second cluster 534, one or more images from the third cluster 536, etc. In one illustrative example, the trained NMF network 400 of FIG. 4 can also be referred to herein as a trained planar reconstruction and segmentation machine learning network. In some aspects, training of a machine learning network (e.g., such as the machine learning NMF network 400, among various other machine learning networks of FIGS. 3-12, etc.) can be performed using online training, offline training, and/or various combinations of online and offline training. In some cases, online may refer to time periods during which the input data (e.g., such as the 2D input image 410 of FIG. 4, etc.) is processed, for instance for performance of the 3D planar mesh reconstruction processing implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others.

In some aspects, online training of a machine learning network (e.g., such as NMF machine learning network 400 of FIG. 4, etc.) may also be referred to as online device training and/or on-device training. For instance, in on-device training, the same computing device (e.g., UE, smartphone, tablet computing device, wearable computing device, XR/AR device, vehicle computer or processor, drone processor, robotic processor, etc.) used to perform training of a machine learning network is used to perform inference using the trained machine learning network. In on-device training, the same computing device may be utilized to perform and/or implement both the training stage(s) of a machine learning network and the inference stage(s) of the corresponding trained machine learning network. For instance, in online or on-device training for NMF machine learning network 400 of FIG. 4, the computing device used to perform training of the NMF machine learning network 400 can be used to perform planar mesh reconstruction based on inference implementing or using the resulting trained NMF machine learning network 400.

In one illustrative example, images can be sampled randomly from each cluster of the plurality of clusters. The random sampling can be performed without repetition (e.g., an image previously selected to be used as the 2D input image 410 for training NMF network 400 is not selected and used as input for a second time, etc.). In some aspects, at least one image can be randomly sampled and used as the 2D input image 410 during each epoch associated with training the NMF network 400. For instance, for an example pass size=4, in a first pass the NMF network 400 can be trained using a first and second image from a first cluster and a first and second image from a second cluster as the respective 2D input images 410 (e.g., where each of the four images in the pass is provided sequentially to the NMF network 400 as the 2D input image 410). In a second pass, the NMF network can be trained using a first and second image from a third cluster and a first and second image from a fourth cluster as the respective 2D input images 410, etc.

The randomly selected image from a particular cluster can be provided to the NMF network 400 as the 2D input image 410, which can be pushed into two pre-trained machine learning networks 422 and 424. In one illustrative example, a depth estimation machine learning network 422 can be used to generate a predicted depth map 425 based on the 2D input image 410. The predicted depth map 425 can also be referred to as an estimated depth map and/or a pseudo-depth map, and can be indicative of an estimated depth value (e.g., pseudo-depth value) determined for each pixel (e.g., each pixel location) included in the 2D input image 410. The estimated depth values can be indicative of the distance (e.g., depth) from an origin coordinate, O, of the camera sensor to the real-world location corresponding to each pixel of the 2D input image 410. In one illustrative example, the depth estimation machine learning network 422 can be a monocular depth prediction machine learning network.

A surface normal estimation machine learning network 424 can be used to generate a predicted surface normal map 427 based on the 2D input image 410. The predicted surface normal map 427 can also be referred to as a normal map, and can be indicative of an estimated or predicted surface normal vector determined for each pixel (e.g., each pixel location) included in the 2D input image 410. For example, the normal map 427 can include a normal vector, n, for each pixel of the 2D input image 410, where $n=(n_1, n_2, n_3)$.

In one illustrative example, the depth estimation machine learning network 422 and the surface normal estimation machine learning network 424 can be pre-trained. For instance, the corresponding parameters of each machine learning network can be frozen and are not optimized on the training data (e.g., the randomly sampled 2D input images 410 obtained from the image sampling 500 or clustering). In some aspects, the depth estimation machine learning network 422 and the surface normal estimation machine learning network 424 can be implemented based on the same machine learning model or architecture. For instance, the depth estimation machine learning network 422 and the surface normal estimation machine learning network 424 can be implemented based on the Omnidata machine learning model.

The pseudo-depth map 425 and the normal map 427 can be used to perform a planar distance computation and generate a planar distance map 430. The planar distance map 430 can also be referred to as "D-map" 430. For instance, assuming each pixel in the 2D input image 410 lays on a planar surface (e.g., where each pixel and pixel location corresponds to a respective pixel and pixel location in both the pseudo-depth map 425 and the normal map 427), the D-map 430 can be calculated as the planar distances $|d_{pl}|$ from the camera center in 3D world coordinates.

In one illustrative example, the D-map 430 and planar distances $|d_{pl}|$ can be determined using the intrinsic parameters of the camera used to capture 2D input image 410 (e.g., a monocular moving camera), and based on the depth (e.g., from pseudo-depth map 425) and the normal vector (e.g., from normal map 427) for each pixel in the 2D input image 410.

For instance, using the pinhole camera model and given the focal length ($f_x$, $f_y$) and principal point ($u_0$, $v_0$), each pixel $p=(u, v)^T$ of the plurality of pixels included in the 2D input image 410 can be mapped to a corresponding 3D point $P=(X, Y, Z)^T$, using the pseudo-depth value Z obtained from the pseudo-depth map 425 for the pixel p. The pseudo-depth value for pixel p (e.g., the pixel having the pixel coordinates (u, v)) can be given as $Z=d_{(u, v)}$, where d is the pseudo-depth map 425 predicted by the depth prediction machine learning network 422.

Here, P represents a 3D point in the camera view coordinate system and p is a pixel location in the 2D input image 410. X and Y represent the location of the 3D point P along respective first and second dimensions of the camera view coordinate system, and Z represents the location of the 3D point P along a third dimension of the camera view coordinate system (e.g., the estimated depth of the 3D point P corresponding to pixel p). The value of Z can be obtained from the pseudo-depth map 425, at the pixel location of pixel p. The respective values of X and Y can be determined as $$X = \frac{Z(u-u_0)}{f_x}$$

and $$Y = \frac{Z(v-v_0)}{f_y}.$$

A planar depth $d_{pl}$ can be determined for each pixel p (and corresponding 3D point P) based on an assumption that every pixel p is part of one planar surface in the scene, and is associated with a corresponding plane with the point-normal form 3D plane equation given by $n \cdot P + d_{pl} = 0$. As noted above, $d_{pl}$ represents the planar depth of a pixel. Here, $n=(n_1, n_2, n_3)^T$ represents the normal vectors predicted for the 2D input image 410. The corresponding normal vector n for the pixel p can be obtained from the predicted normal map 427.

The planar depth $d_{pl}$ can be determined for each pixel p included in 2D input image 410 and having the pixel coordinates (u, v) as:

$$d_{pl} = d_{(u,v)} \cdot \left( \frac{n_1}{f_x}(u_0 - u) + \frac{n_2}{f_y}(v_o - v) - n_3 \right) \qquad \text{Eq. (1)}$$

The normal vector $n=(n_1, n_2, n_3)^T$ and the planar depth $d_{pl}$ can both be view-dependent. Using the given camera pose information associated with the 2D input image 410 (e.g., the camera pose used to capture 2D input image 410), the normal vector n and the planar depth $d_{pl}$ can be transferred into the universal 3D world coordinate system.

Figure 6:
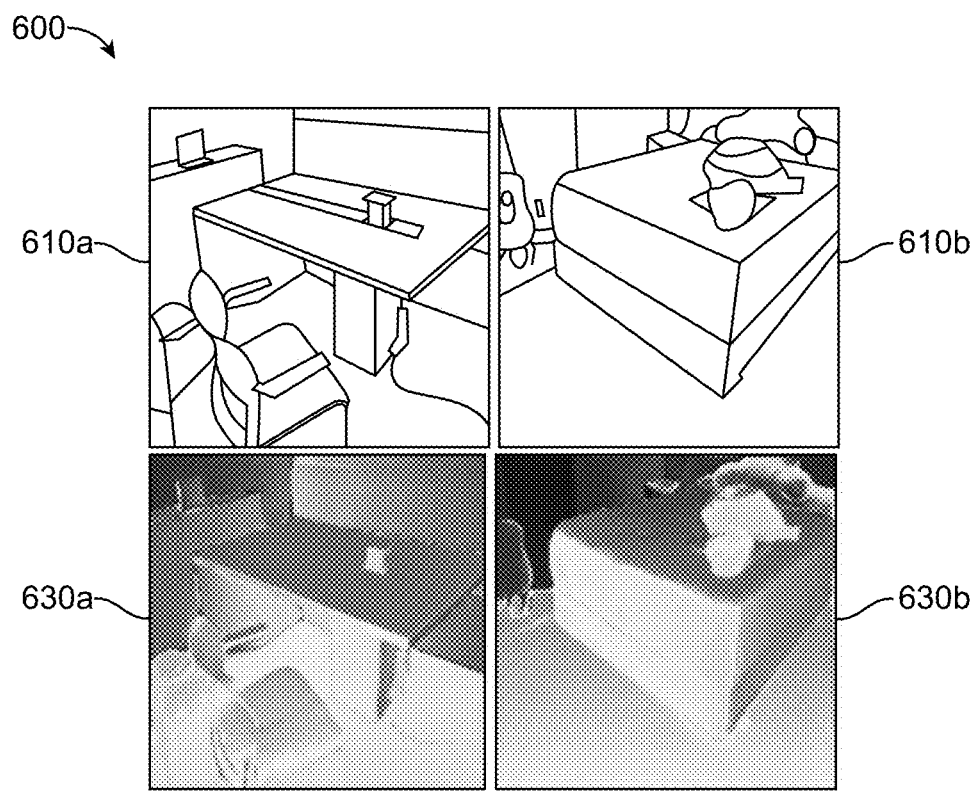
FIG. 6 depicts examples of images and corresponding D-maps generated using the images, in accordance with some examples.

FIG. 6 is a diagram 600 illustrating examples of 2D input images and corresponding D-maps (e.g., planar depth maps including a $d_{pl}$ value for each pixel). For instance, a first 2D input image 610*a* can be used to generate a corresponding first D-map 630*a*. A second 2D input image 610*b* can be used to generate a corresponding second D-map 630*b*. The D-maps 630*a*, 630*b* can be generated to include a planar depth $d_{pl}$ for each pixel location of the 2D input image 610*a*, 610*b*, respectively, using Eq. (1) above.

As noted previously, the planar depth $d_{pl}$ can represent a distance from the camera center in 3D world coordinates. For instance, the planar depth $d_{pl}$ can be indicative of an offset of the particular plane associated with each pixel to the camera center. Pixels lying on the same planar surface (e.g., same plane) can be associated with same or highly similar values of the planar depth $d_{pl}$. For example, the pixels associated with the planar surface of the table seen in D-map 630*a* may have same or highly similar planar depth values $d_{pl}$, the pixels associated with the planar surface of the floor (or wall) seen in D-map 630*a* may have same or similar planar depth values $d_{pl}$, etc.

In one illustrative example, the D-map 430 can be used to perform planar segmentation. For instance, the one or more planes (e.g., planar surfaces) included in the 2D input image 410 of FIG. 4 can be segmented using the D-map 430, the normal map 427, and positional encoding information 432 associated with D-map 430. For example, planar segmentation can be performed based on a feature vector that includes D-map 430, normal map 427, and positional encoding 432. In some aspects, the positional encoding information 432 can include one or more trigonometric functions and/or trigonometric representations of the position information associated with each pixel of the 2D input image 410 (e.g., trigonometric functions or representations of the pixel position information (u, v) for each pixel p). For example, the positional encoding 432 can be a 2D positional encoding of every pixel p included in the 2D input image 410.

Planar segmentation information 440 can be generated based on performing clustering over the feature vector including D-map 430, normal map 427, and positional encoding 432. In one illustrative example, the planar segmentation information 440 can be generated based on performing clustering using a mean-shift clustering algorithm (e.g., based on performing mean-shift clustering).

Based on clustering using the feature vector of D-map 430, normal map 427, and positional encoding 432, the image pixels (e.g., the pixels p of 2D input image 410) are grouped into multiple segments, each segment representing a corresponding planar surface within the 2D input image 410. The output of the clustering of the provided features is the 2D plane segmentation 440, which may also be referred to as "plane clusters," "planes (clusters)," etc.

In one illustrative example, the 2D plane segmentation 440 can be used to generate one or more 3D mesh fragments 450. For example, a triangular mesh (e.g., a triangular mesh fragment, such as a 3D mesh fragment 450) can be initialized using a quantity, N, of 2D positions sampled from the 2D image domain. In some aspects, each mesh fragment $\mathcal{M}'_k$ can be generated (e.g., initialized) as a 3D triangular surface mesh, based on sampling a set of sparse pixels from each planar segment of the 2D plane segmentation 440. A farthest-first traversal algorithm (e.g., farthest-point sampling) can be used to sample the set of sparse pixels from each planar segment of the 2D plane segmentation 440.

In some examples, the quantity of sampled points per planar segment can be proportional to the area of the segmented plane within the 2D input image 410. In some aspects, a maximum total quantity of N sampled points are used as the vertices of a 2D triangular mesh that can be obtained by performing the Delaunay triangulation (e.g., based on using the Delaunay triangulation on the sampled 2D points, a 2D triangular mesh can be constructed).

Figure 7:
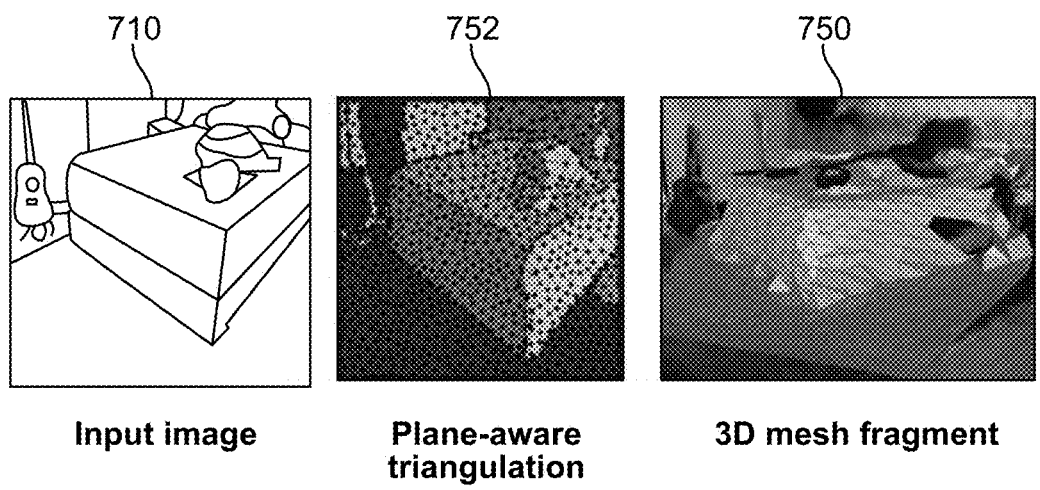
FIG. 7 illustrates an example of mesh initialization, in accordance with some examples.

For instance, FIG. 7 illustrates an example of mesh initialization 700. An input image 710 can be the same as or similar to the 2D input image 410 of FIG. 4. The 3D mesh fragment 750 of FIG. 7 can be the same as or similar to the 3D mesh fragment $\mathcal{M}'_k$ (450) of FIG. 4. Image 752 of FIG. 7 illustrates an example of plane-aware triangulation that may be performed as described above. For instance, image 752 illustrates a triangular mesh on sampled vertices from planar segments. A first set of vertices can be obtained based on using farthest-point sampling to obtain a set of sparse pixels from a first planar segment corresponding to the floor shown in image 710; a second set of vertices can be obtained based on using farthest-point sampling to obtain a set of sparse pixels from a second planar segment corresponding to the foot of the bed shown in image 710; a third set of vertices can be obtained based on using farthest-point sampling to obtain a set of sparse pixels from a third planar segment corresponding to the top of the bed shown in image 710; etc. The 3D mesh fragment 750 can be generated based on performing the Delaunay triangulation on the sets of vertices sampled using farthest-first traversal for each planar segment determined for the 2D input image 710.

The edges (e.g., faces F) across distinct planar segments can be suppressed to ensure that the obtained mesh is planar and does not include edges across two planes with different planar depth ($d_{pl}$). Using the pseudo-depth map 425 corresponding to 2D input image 410, the vertices of the 2D triangular mesh (e.g., the 2D triangular mesh generated based on the Delaunay triangulation of the sampled points/vertices) are transferred into 3D space to represent as the 3D mesh fragment 450, given as $\mathcal{M}'_k = \mathcal{M}_k^{(I_j)} = (V_j, F_j)$. Here, $I_j$ is the 2D input image 410, $V_j$ is the set of vertices sampled for the 2D input image 410, and $F_j$ represents the faces (e.g. triangular primitives) of the mesh. Each 3D vertex $V_i$ can inherit a ray direction $r_i$ and a cluster index corresponding with the planar segment from which the 3D vertex Vis sampled. The ray direction $r_i$ can be determined based on intrinsic, extrinsic, and/or pose information, etc. 452 associated with the camera used to capture the 2D input image 410.

In some aspects, the 3D mesh fragment 450 ($\mathcal{M}'_k$) is constructed based on the predicted (e.g., pseudo) depths included in the pseudo-depth map prediction 425, and the positions of its vertices may have an unknown scale bias and shift bias with respect to their actual (e.g., ground-truth) positions in the 3D scene corresponding to 2D input image 410. In one illustrative example, the NMF network 400 can include depth correction 460 to determine values for learning parameters $\pi_j$ (e.g., corresponding to the scale bias, and referred to as a scale bias correction or a scale bias learning parameter) and $\beta_j$ (e.g., corresponding to the shift bias, and referred to as a shift bias correction or a shift bias learning parameter).

The scale bias and shift bias may vary per image (e.g., per 2D input image 410), and the two learning parameters $\pi_j$ and $\beta_j$ can be used to correct the scale and shift biases, respectively. For instance, if reconstructing the entire scene uses a quantity, K, of 3D mesh fragments 450, a total of 2*K parameters can be optimized jointly with the parameters of the neural rendering network 470, as will be described in greater depth below.

In one illustrative example, the learning parameters $\pi_j$ and $\beta_j$ are optimized during training to correct the position of the i-th vertex of the j-th mesh fragment 450 as follows:

$$V_{ij}^{updated} = ((\pi_j - 1) \cdot t_{ij}^{init} + \beta_j) \cdot v_{ij}^{init} + V_{ij}^{init} \qquad \text{Eq. (2)}$$

Here, $f_{ij}$ represents the distance along the ray direction $v_{ij}$ from the camera origin o in the form of $v_{ij}^{init} = o_j + t_{ij}^{init} \cdot v_{ij}^{init}$. The superscript $(\cdot)^{init}$ denotes the initialized state of a variable. Eq. (2) indicates that updating the position of the i-th vertex in the j-th 3D mesh fragment 450 is constrained by a 3D displacement along its ray direction $v_{ij}$.

Figure 8:
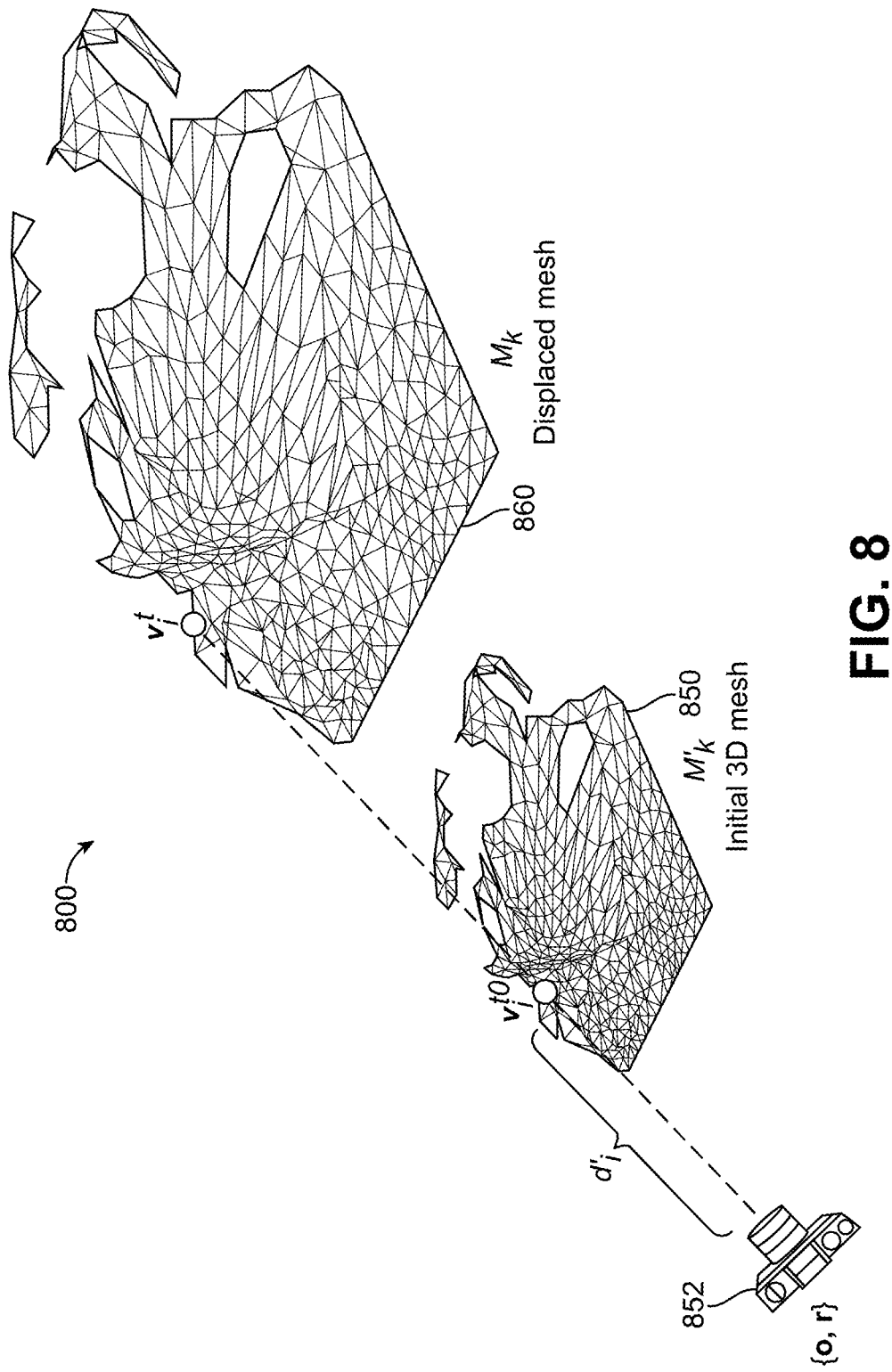
FIG. 8 illustrates an example of depth correction between an initial 3D mesh and a depth-corrected displaced 3D mesh, in accordance with some examples.

The ray direction $v_{ij}$ of Eq. (2) is depicted in FIG. 4 and FIG. 8 as the ray direction r. The distance $t_{ij}$ of Eq. (2) is depicted in FIG. 4 as the distance d', and is depicted in FIG. 8 as the distance $d_i'$. The initial mesh vertex $V_{ij}^{init}$ of Eq. (2) is depicted in FIG. 8 as the initial mesh vertex $v_i^{r0}$. The updated mesh vertex $V_{ij}^{updated}$ of Eq. (2) is depicted in FIG. 8 as the updated mesh vertex $v_i^{r'}$.

In some aspects, the scale ($\pi_k$) and shift ($\beta_k$) are initialized by unity and zero values, respectively. In each training iteration, the scale ($\pi_k$) and shift ($\beta_k$) factors can be applied to update the initial mesh vertices ($v^{r0}$) to position (e.g., re-position) the mesh closer to the scene surfaces by minimizing the loss function. In some examples, an updated depth $d_i$ can be determined for the vertex $v_i$ (e.g., $V_{ij}^{updated}$ of Eq. (2)) as $d_i = \|o - v_i'\|_2$.

FIG. 8 illustrates an example of depth correction 800 between an initial 3D mesh 850 (e.g., $\mathcal{M}_k'$) and a depth-corrected displaced 3D mesh 860 (e.g., $\mathcal{M}_k$), in accordance with some examples. The depth-corrected displaced 3D mesh 860 can be generated by performing depth correction according to Eq. (2) for each vertex of the initial 3D mesh 850. A depth corrected vertex can be displaced to an updated depth di that is closer to the camera 852 origin o or can be displaced to an updated depth $d_i$ that is farther from the camera 852 origin o.

In one illustrative example, a 3D mesh of scene surfaces can be initialized using multiple 2D input images 410 from the clustered images of FIG. 5. For instance, a 3D triangular surface mesh $\mathcal{M}$ can be initialized to cover almost the entirety of the surfaces that are visible in the training images (e.g., the multiple 2D input images 410) of the scene. In some aspects, the 3D triangular surface mesh $\mathcal{M} = \{\mathcal{M}^0, \mathcal{M}^1, \ldots, \mathcal{M}^n\}$ includes multiple individual meshes (e.g., multiple 3D mesh fragments 450), each estimated from a corresponding single image frame (e.g., multiple 3D mesh fragments 450 each estimated from a corresponding 2D input image 410) from a collection of diverse views of the scene.

Learning the scene geometry can start with an empty set ($\mathcal{M} = \{\emptyset\}$) and the initialization of $\mathcal{M}$ can be performed progressively by rendering training input images 410, using the rendering engine 470 (e.g., as will be described in greater depth below). For instance, to render image pixels, multiple rays $\{r\}$ can be cast from the camera origin $o \in \mathbb{R}^3$ through the scene mesh $\mathcal{M}$, along the corresponding ray direction $v \in \mathbb{R}^3$. The intersection of rays and the scene mesh $\mathcal{M}$ can be determined for the current 2D input image 410 frame ($I_j$). If the quantity of rays that do not hit (e.g., intersect) with the scene mesh $\mathcal{M}$ is greater than a threshold (e.g., a threshold ratio), then the current 2D input image 410 ($I_j$) can be used to construct a fragment $\mathcal{M}^j$ (e.g., a 3D mesh fragment 450), as described above, and the newly constructed fragment $\mathcal{M}^j$ is added to the set $\mathcal{M}$ corresponding to the scene geometry and complete 3D triangular surface mesh.

In one illustrative example, the threshold of accepting (e.g., utilizing) 2D input image 410 ($I_j$) to generate a fragment $\mathcal{M}^j$ (e.g., a 3D mesh fragment 450) can be increased gradually during a plurality of training iterations used to perform training of the NMF network 400 of FIG. 4. For instance, the threshold of accepting a 2D input image 410 for generating a 3D mesh fragment 450 can be increased gradually within a predefined range (e.g., from 50% to 99%, etc.). Increasing the acceptance threshold for generating a 3D mesh fragment 450 can be used to increase the probability that the full 3D triangular surface mesh M generated for the scene covers substantially all of the scene surface(s) using a relatively low quantity of fragments (e.g., a quantity of fragments n«50, in some examples).

The full 3D triangular surface mesh, $\mathcal{M}$, described above can be the same as or similar to one or more (or a combination thereof) of the depth-corrected 3D mesh $\mathcal{M}_k$ generated using the depth correction 460 of FIG. 4. In some aspects, the initialized and depth-corrected 3D mesh $\mathcal{M}$ generated based on depth correction 460 can be optimized based on performing differentiable rendering on a discrete field. In some examples, rendering engine 470 can be implemented using one or more multilayer perceptron (MLP) machine learning networks, and may be used to generate one or more corresponding predictions for a radiance field (e.g., the radiance field or color information 484 of FIG. 4) and plane instance field (e.g., plane segmentation information 490 of FIG. 4). In some aspects, the rendering engine 470 is not used for geometric rendering associated with the 2D input image 410, based on the geometry associated with 2D input image 410 being represented explicitly. Based on the explicit representation of the geometry, both depth map information (e.g., depth map information 486 of FIG. 4) and normal map information (e.g., normal map information 488 of FIG. 4) can be predicted for each camera view (e.g., for each 2D input image 410) by a closed-form solution.

For instance, the exact intersection(s) of one or more rays and the surface(s) or triangular plane(s) included in $\mathcal{M}$ can be determined using a closed-form solution. In one illustrative example, the Möller-Trumbore algorithm can be used for fast implementation of ray-triangle intersection determination. In each training iteration of the NMF network 400, a fixed quantity of rays r can be randomly sampled for ray casting. The intersection points $p_i^h$ between rays and the triangular planes of all meshes can be determined by the rendering engine 470.

Figure 9:
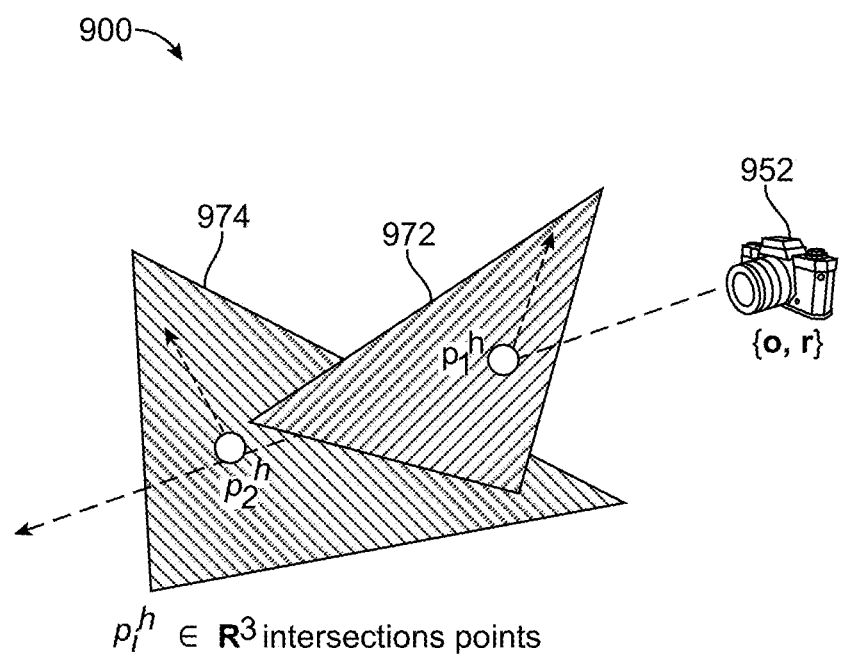
FIG. 9 illustrates an example of ray-triangle intersections that can be used for explicit geometric rendering, in accordance with some examples.

For example, FIG. 9 illustrates an example of ray-triangle intersections 900 that can be used for explicit geometric rendering, in accordance with some examples. A ray r is cast (e.g., projected) from the origin point o associated with the camera 952 (e.g., the sensor plane, or center coordinate thereof, of camera 952) and toward the 3D triangular mesh $\mathcal{M}$. The intersection points $p_i^h$ between rays and the triangular planes of all meshes can include an intersection between the ray r and a first triangle 972, shown as the first intersection point $p_1^h$, and can include an intersection between the ray r and a second triangle 974, shown as the second intersection point $p_2^h$, etc. Each intersection point $p_i^h$ can be associated with a corresponding surface normal vector (e.g., a surface normal vector to the plane of the respective triangle of the 3D mesh $\mathcal{M}$), for $p_i^h \in \mathbb{R}^3$ intersection points.

In some cases, each ray (e.g., of a plurality of rays r) can be cast so that the ray emanates from the camera origin o, passes through a particular pixel of the 2D input image 410, and hits (e.g., intersects) one or more triangular faces in the 3D mesh $\mathcal{M}$. Assuming that faces $F_0, \ldots, F_L$ are intersected, with L representing the total quantity of faces that are intersected. In some cases, the value of L may be relatively small, for example equal to one in many cases. The intersection points $P^h \in \mathbb{R}^3$ of ray-triangular faces (e.g., and the corresponding depths) can be determined using the fast Möller-Trumbore algorithm. In one illustrative example, ray-triangle intersections are determined by rendering engine 470 without using ray marching.

For each ray r, the one or more intersection points can be obtained and evaluated using a multilayer perceptron (MLP) machine learning network to predict information associated with the ray and/or the ray-triangle intersection. For instance, an MLP with a composition of functions $g \circ f(x)$ can be used to estimate the transparency $\alpha$ (e.g., density) and radiance c (e.g., color) emanating along the ray at the point $P^h$. In some aspects, the MLP can additionally be used to estimate an embedding vector associated with the ray r and the intersection point $P^h$. In one illustrative example, the MLP can be given as:

$$(c, \alpha) = g \cdot f(\gamma(P^h)) \quad \text{Eq. (3a)}$$

$$(\alpha_j, c_j) = g \cdot f(\gamma p^h) \quad \text{Eq. (3b)}$$

Here, Eqs. (3a) and (3b) can be alternate formulations of one another (e.g., using different notation). The value of $\gamma$ can represent a fixed positional encoding using trigonometric functions (e.g., the positional encoding 432 of FIG. 4), which can be used to map $P^h$ into a higher-dimensional space.

The intersected points $\{P^h\}$ of each ray r can be sorted in an increasing order of respective depths from the camera origin o. In some cases, sorting the intersected points $\{P^h\}$ in increasing order of depth can include and/or be the same as sorting the $\alpha_j$ values of the intersected points based on their respective distance to the camera center (e.g., origin) o. In some aspects, alpha composition can be used to determine the integral of weighted quantities along the ray. For instance, alpha composition can be used to blend the point-set colors estimated by Eq. (3a) or Eq. (3b), to render a corresponding pixel color as:

$$\hat{c}(r) = \sum_{i=1}^{L} \alpha_i \cdot c_i^h \cdot \prod_{j=1}^{i-1}(1 - \alpha_j) \quad \text{Eq. (4)}$$

Here, $L=|\{P^h\}|$ is the size of the point set. In some examples, the 3D mesh $\mathcal{M}$ can provide the explicit representation of scene surfaces, and rendering the depth $\hat{d}(r)$ and normal vector $\hat{n}(r)$ for each ray r can be performed based on alpha composition of depths and normal of intersected triangles, for instance similar to the formulation for color provided above in Eq. (4).

For example, the MLP network and/or rendering engine 470 can be used to generate (e.g., render) color information $\{c_i\}$ 484 corresponding to the i vertices of the ray-triangle intersected points. In one illustrative example, the color information $\{c_i\}$ 484 can be generated (e.g., rendered) using alpha composition to determine the integral of weighted quantities along each ray (e.g., using Eq. (4)).

In some examples, rendering engine 470 can be used to determine depth information $\{d_i\}$ 486 based on an alpha composition of the depths of all intersected triangular planes along each ray. For instance, the depth information $\{d_i\}$ can be determined based on an alpha composition of ray length information, where the ray length information is indicative of a length (e.g., distance) of a ray between the camera origin o to an intersected point $p_i^h$.

In another example, rendering engine 470 can be used to determine surface normal information $\{n_i\}$ 488 based on an alpha composition of the respective normal of all intersected triangular planes along each ray (e.g., an alpha composition of the normal vector of each intersected point $p_i^h$).

In one illustrative example, rendering engine 470 can determine semantic information $\{s_i\}$ 490 based on an alpha composition of the respective embeddings $s_i$ of all intersected triangular planes along each ray. For instance, a respective embedding $s_i$ can be determined for each of the i vertices corresponding to the intersected points $p_i^h$. In some cases, the semantic information $\{s_i\}$ 490 can also be referred to as an embedding vector. In one illustrative example, the semantic information $\{s_i\}$ 490 can be a spherical embedding indicative of discriminative features across a plurality of plane instances included in the reconstructed 3D mesh, and may be used to perform plane instance segmentation. In some aspects, the semantic information $\{s_i\}$ 490 of FIG. 4 (e.g., the spherical embedding 490 of FIG. 4) can be the same as or similar to the spherical embedding 1030 of FIG. 10, described in greater detail below.

Based on the color information 484, the depth information 486, the surface normal information 488, and/or the spherical embedding information 490, the systems and techniques can be used to generate a 3D planar reconstruction 495 corresponding to the scene associated with 2D input image(s) 410. The 3D planar reconstruction 495 can include a plurality of 3D planar meshes (e.g., a plurality of 3D triangular meshes) each corresponding to a respective planar surface of the scene. The vertices of the 3D planar meshes are positioned in the 3D space associated with the 3D planar reconstruction 495 at initial positions based on the pseudo-depth values of depth map 425. The initial positions of the vertices of the 3D planar meshes can be refined (e.g., optimized) using the MLP network and alpha composition through explicit neural rendering (e.g., as described above). The MLP network can associate a unique label to all vertices that belong to a representative planar surface in the 3D mesh of the scene (e.g., in the 3D mesh that includes the plurality of 3D planar meshes). In some aspects, the MLP network can assign the unique labels (e.g., planar segmentation labels) based on maximizing label assignments between predicted labels and 2D labels obtained using unsupervised plane segmentation from 2D images (e.g., the 2D plane segmentation information 440 corresponding to one or more 2D input images 410).

In one illustrative example, the depth, normal, and semantic (e.g., plane IDs) fields can be estimated using the alpha composition of the depths, normal, and embeddings of all intersected triangular planes along each ray based on:

$$u(o, r) = \sum_{i=1}^{L} \alpha_i \cdot u_i^h \prod_{j=1}^{i-1}(1 - \alpha_j) \quad \text{Eq. (5a)}$$

Here, the variable u can represent the color (e.g., radiance) information c, surface normal information n, class probability vector fields, depth scalar fields, etc. In some aspects, Eq. (5a) can be additionally parameterized based on $(\alpha_j, c_j) = g \circ f(\gamma p^h)$, as given in Eq. (3b) above, and/or further based on $s_j = h \circ f(\gamma p^h)$.

In some aspects, the 3D mesh $\mathcal{M}$ includes multiple 3D mesh fragments $\mathcal{M}_k$. Some (or all) of the multiple 3D mesh fragments $\mathcal{M}_k$ may be at least partially overlapping. When 3D mesh fragments $\mathcal{M}_k$ overlap, a physical surface in the scene may be represented by more than one surface mesh (e.g., may be represented by a surface mesh in each of the overlapping fragments $\mathcal{M}_k$). In one illustrative example, the NMF network 400 of FIG. 4 can be used to fuse duplicated and/or overlapping areas within the 3D mesh $\mathcal{M}$. NMF network 400 can perform mesh fusion based on deforming neighboring or adjacent (e.g., overlapping) 3D mesh fragments $\mathcal{M}_k$ coherently, using a divergence loss that can be implemented to pull the 3D mesh fragments toward one another during training (e.g., optimization) of the NMF network 400:

$$\mathcal{L}_{div} = \sum_{r} \sum_{i=1}^{L} \|P_i^h - P_M^r\|_2^2, \quad \text{Eq. (5b)}$$

-continued where $$P_M^r = \sum_{i=1}^{L} \alpha_i \cdot P_i^h \cdot \prod_{j=1}^{i-1}(1 - \alpha_j)$$

Here, $P_M^h$ represents the soft mean of intersected points along the ray.

As noted previously above, g and f can be associated with an MLP neural network, etc. For instance, g can represent a first MLP prediction head and f can represent a second MLP prediction head. Additionally, h can represent a third MLP prediction head. The MLP prediction heads g, f, and h can be different from one another.

In examples where Eq. (5a) and/or Eq. (5b) is parameterized based on $s_j=h \circ f(\gamma p^h)$, $s_j$ can represent a segmentation instance. For instance, in one illustrative example, $s_j$ can be an embedding or feature vector associated with a particular segmentation instance j, where $s_j$ can be used to discriminate the particular segmentation instance j from the remaining segmentation instances in the set of clustered (e.g., segmented) planes 440 of FIG. 4. In some cases, $s_j$ can be the same as or similar to the feature vector described above that is used to perform planar segmentation 440 (e.g., the feature vector that includes D-map 430, normal map 427, and positional encoding 432). A feature vector or discriminative embedding $s_j$ can be determined for each pixel of the plurality of pixels in each 2D input image 410 and/or the plurality of pixels in the scene being reconstructed using the NMF network 400 of FIG. 4.

In some aspects, in addition to the 3D planar reconstruction of the scene, the NMF network 400 can be used to segment the 3D mesh $\mathcal{M}$ into plane instances. For instance, the 3D mesh $\mathcal{M}$ can be segmented into plane instances to group the various mesh faces into different classes, where each class corresponds to a particular plane instance. In one illustrative example, the NMF network 400 can be used to segment the plane instances without using ground truth annotations (e.g., without using ground truth labels).

For example, the NMF network 400 can be trained to learn an embedding $s_j$ that discriminates features across plane instances. In some instances, the MLP network described above can be used to predict a vector $s \in \mathbb{R}^3$ for each intersection point (e.g., $s_j=h \cdot f(\gamma p^h)$, as given above). The norm of vectors s can be constrained to be equal to unity $\|s\|_2=1$, and the vectors s expand on a spherical embedding 1030 depicted in FIG. 10, which illustrates an example of spherical embedding for segmented planar instances.

Figure 10:
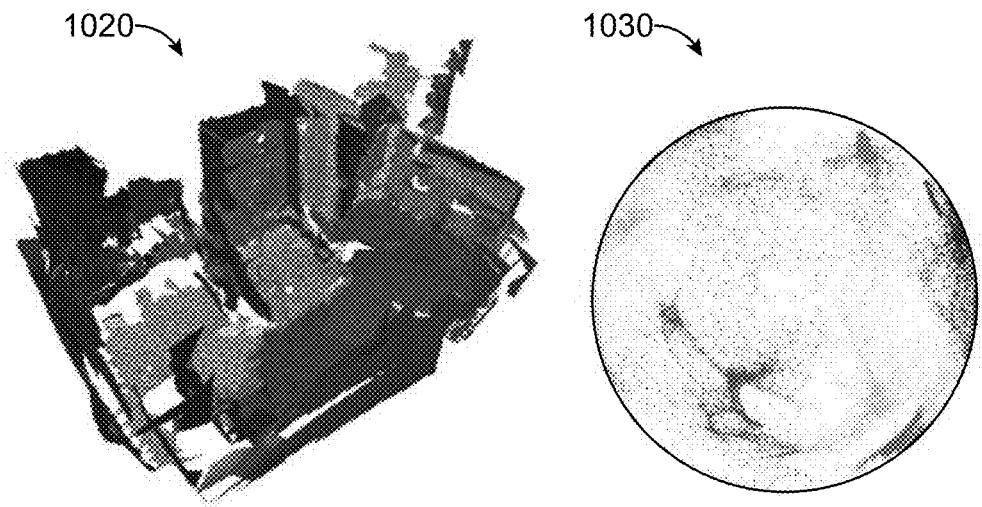
FIG. 10 illustrates an example of a spherical embedding corresponding to segmented planar instances, in accordance with some examples.

A contrastive loss can be used to learn discriminating features of plane instances in the spherical embedding s (e.g., 1030 of FIG. 10). For example, the contrastive loss can be based on positive pairs of rays and negative pairs of rays. Positive pairs of rays can include a first and second ray that are considered similar to one another.

Figure 11:
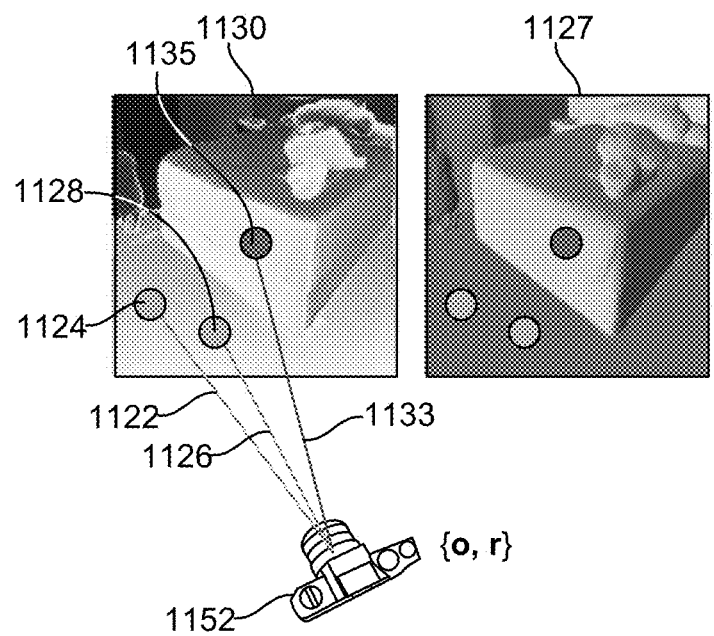
FIG. 11 illustrates an example of ray sampling for contrastive learning, in accordance with some examples.

For example, a positive pair of rays can include the first ray 1122 and the second ray 1126 depicted in FIG. 11, which illustrates an example of ray sampling for contrastive learning 1100). The rays 1122 and 1126 can be similar to one another based on each ray being associated with a respective point (e.g., pixel location) within a D-map 1130 or a normal map 1127 that falls within the same planar surface. For instance, the D-map 1130 may be the same as or similar to the D-map 430 of FIG. 4 and the normal map 1127 may be the same as or similar to the normal map 427 of FIG. 4. The first ray 1122 emanates from the origin o of camera 1152, and intersects the point 1124 in D-map 1130. The second ray 1126 emanates from the origin o of camera 1152 and intersects the point 1128 in D-map 1130. The two corresponding intersection points 1124 and 1128 are included in the same planar surface of D-map 1130, which in the example of FIG. 11 is the planar surface of the floor (e.g., have D-map values that are the same or similar to one another).

A pair of negative rays for contrastive loss can include a first ray and a second ray that are not similar to one another (e.g., a first ray associated with a first planar surface and a second ray associated with a second planar surface different from the first planar surface). For instance, both the rays 1122 and 1126 are associated with a different planar surface than the third ray 1133 of FIG. 11. The third ray 1133 emanates from the origin o of camera 1152 and intersects the point 1135 in D-map 1130. The intersection point 1135 is included in a planar surface (e.g., side of the bed) that is different than the planar surface including the intersection points 1124 and 1128 (e.g., the floor). A pair of negative rays could include the first ray 1122 and the third ray 1133. A pair of negative rays could additionally include the second ray 1126 and the third ray 1133.

In some aspects, the pairs of positive rays used for the contrastive loss for learning discriminating features of plane instances in the spherical embedding s can include rays belonging to a same frame. For instance, the pairs of positive rays can be obtained from the D-map 1130, or the pairs of positive rays can be obtained from the normal map 1127. Pairs of positive rays, in some aspects, are not obtained across a first and second D-map or across a first and second normal map (e.g., both rays included in a pair of positive rays can be obtained based on a D-map or normal map that are both generated for the same 2D input image 410).

In some examples, contrastive pairs of rays (e.g., negative pairs of rays) used for the contrastive loss for learning discriminating features of plane instances in the spherical embedding s can include rays that are obtained for the same frame and can additionally include rays that are obtained across different frames (e.g., a first ray of the contrastive pair corresponds to a D-map or normal map generated based on a first 2D input image 410, and a second ray of the contrastive pair corresponds to a D-map or normal map generated based on a second 2D input image 410). In some examples, contrastive pairs of rays that are obtained across images in the training batch may use the normal maps 1127 corresponding to the different images of the training batch (e.g., in some cases, contrastive pairs of rays across images in the training batch do not use the corresponding D-maps for the different images).

In some cases, the plane-instance segmentation can be used to assign a unique label to the planar surfaces in the deformed 3D mesh $\mathcal{M}$. In one illustrative example, the deformed 3D mesh $\mathcal{M}$ can be segmented into planar surfaces using the prediction head h of the MLP network with a composition of functions $h \circ f(x)$ to map the 3D intersection points into the vector $s \in \mathbb{R}^3$ to generate a spherical embedding by normalizing $\|s\|_2=1$:

$$s(r) = \sum_{i=1}^{L} \alpha_i \cdot s_i^h \cdot \prod_{j=1}^{i-1}(1 - \alpha_j), \quad \text{Eq. (6)}$$

where $$s_i = h \cdot f(\gamma(P_i^h))$$

The predicted vectors (s(r)) in each training batch can be used for the contrastive learning described above. Positive pairs ($y_{ij}=1$) and negative pairs ($y_{ij}=0$) of rays can be identified based on applying thresholds on the values of planar depth (e.g., determined using Eq. (1)) and normal vectors (n) maps at the location of the intersection of the ray and the 2D image plane.

In one illustrative example, the contrastive loss can be minimized jointly with other loss functions associated with training NMF network 400 of FIG. 4, for learning a discriminative embedding of plane instances in the mesh. For example, plane instance segmentation loss can be specified as:

$$\mathcal{L}_{cont}(s(r_i), s(r_j)) = \begin{cases} y_{ij} \cdot (1 - s(r_i) \cdot s(r_j)^T) + (1 - y_{ij}) \cdot \\ \quad \max(\epsilon, 1 - s(r_i) \cdot s(r_j)^T), & \text{if } (r_i, r_j) \in \mathcal{R} \\ (1 - y_{ij}) \cdot \max(\epsilon, 1 - s(r_i) \cdot s(r_j)^T), & \text{otherwise} \end{cases} \quad \text{Eq. (7)}$$

Here, $\epsilon$ is a hyperparameter indicative of the lower bound distance between samples of different classes. The condition $(r_i, r_j) \in R$ can indicate that two camera rays $r_i$ and $r_j$ are sampled from a same ray vector field R, belonging to an image (e.g., across pixels of an image). The condition can be based on contrastive sampling involving planar distances of pixels as in Eq. (1), which may be valid only across pixels of the same image due to using the pseudo depth values. In some cases, for performing contrastive sampling across rays belonging to two distinct images in the training batch, only normal vectors are considered. After training, by applying mean-shift clustering on the spherical embedding of mesh faces, the indices of plane instances can be determined.

In one illustrative example, the NMF network 400 of FIG. 4 can be trained and/or optimized using one or more objective functions. For instance, the one or more objective functions can include multiple terms for maintaining jointly the geometry and plane instance segmentation tasks. For instance, loss terms can include multi-view color consistency; consistency between rendering depth and normal of mesh faces and the predicted N and D; the divergence loss of Eq. (5b) above; and contrastive loss for plane instance segmentation (e.g., the contrastive loss of Eq. (7), above).

For example, a color rendering loss (e.g., RGB color rendering loss and/or multi-view color consistency loss) can be given as:

$$\mathcal{L}_{color} = \sum_{r} \|c(r) - c_{gt}(r)\|_2^2 \quad \text{Eq. (8a)}$$

$$\mathcal{L}_{rgb} = \sum_{\{r\}} \|\hat{c}(r) - c(r)\|_1 \quad \text{Eq. (8b)}$$

A depth-map loss (e.g., where a and b are computed in closed-form, as the estimated depths should be equal to the pseudo-depth 425 up to scale (a) and shift (b) factors that are estimated in closed-form solution as described previously above), can be given as:

$$\mathcal{L}_{depth} = \sum_{\gamma} \|d(r) - (a \cdot d_{pseudo}(r) + b)\|_2^2 \quad \text{Eq. (9a)}$$

$$\mathcal{L}_{depth} = \sum_{\{r\}} \|\hat{d}(r) - a \cdot \bar{d}(r) + b\|_2^2 \quad \text{Eq. (9b)}$$

A normal-map loss can be given as:

$$\mathcal{L}_{normal} = \sum_{r} [1 - (n(r) \cdot n_{pseudo}(r))] \quad \text{Eq. (10a)}$$

$$\mathcal{L}_{normal} = \sum_{\{r\}} (1 - (\hat{n}(r) \cdot \overline{n}(r))) \quad \text{Eq. (10b)}$$

The divergence loss of Eq. (5b) can also be given as:

$$\mathcal{L}_{div} = \sum_{r} \sum_{i=1}^{L} (\|p_i - p_m\|_2^2), \quad \text{Eq. (11)}$$

where $$p_m = \sum_{i=1}^{L} \alpha_i \cdot p_i \cdot \prod_{j=1}^{i-1}(1 - \alpha_j)$$

A contrastive loss can be given as:

$$\mathcal{L}_{cont}(s(r_i), s(r_j)) \quad \text{Eq. (12)}$$

A total loss term can be given as:

$$\mathcal{L}_{total} = \omega_1 \cdot \mathcal{L}_{rgb} + \omega_2 \cdot \mathcal{L}_{depth} + \omega_3 \cdot \mathcal{L}_{normal} + \omega_4 \cdot \mathcal{L}_{div} + \omega_5 \cdot \mathcal{L}_{cont} \quad \text{Eq. (13)}$$

In the total loss term of Eq. (13), scalars $w_i$ can represent the contribution weights of loss terms, which may be adjusted.

Figure 12:
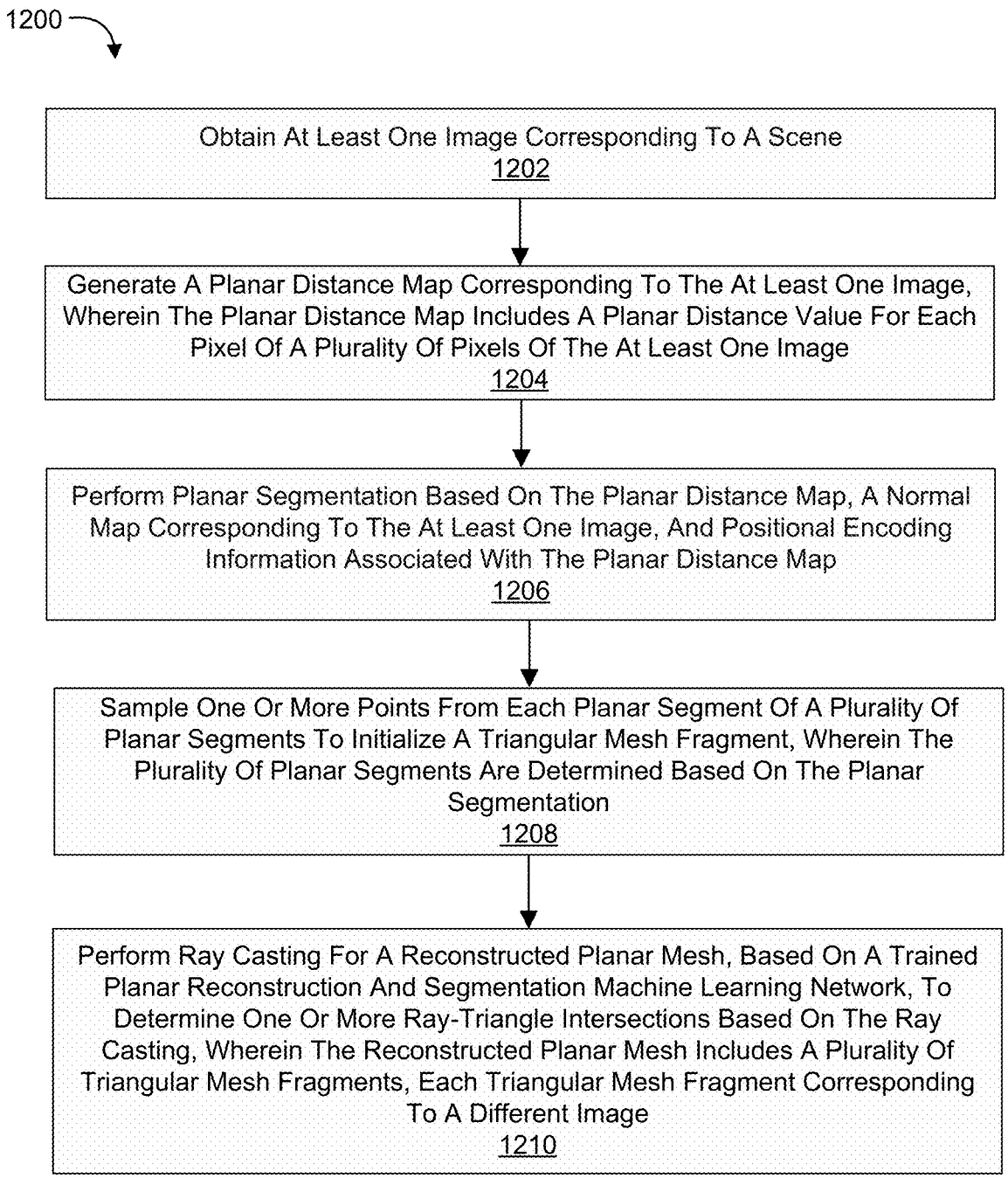
FIG. 12 is a flow diagram illustrating an example process for generating refined disparity map information, in accordance with aspects of the present disclosure.

FIG. 12 is a flowchart illustrating an example process 1200 for processing image data using corresponding to a scene, using one or more of the techniques described herein. The process 1200 can be performed by a computing device (or apparatus), or a component of a computing device (e.g., a chipset, a processor such as a neural processing unit (NPU), a digital signal processor (DSP), etc.), utilizing or implementing a machine learning model (e.g., the machine learning system 400 of FIG. 4, etc.).

At block 1202, the process 1200 can include obtaining at least one image corresponding to the scene. For instance, the at least one image can be obtained from a monocular moving camera, such as the monocular moving camera 311 of FIG. 3, etc. In some cases, the at least one image can comprise a plurality of images. For instance, the at least one image can include one or more of the images 312, 314, 316, and/or 318 of scene 310 of FIG. 3. In some cases, the at least one image can be the same as or similar to one or more of the 2D input image 410 of FIG. 4; one or more of the images included in clusters 532, 534, and/or 536 of FIG. 5; one or more of the images 610*a*, 610*b* of FIG. 6; the image 710 of FIG. 7; etc.

In some examples, obtaining the at least one image comprises obtaining a plurality of images of the scene using a monocular moving camera associated with the scene and determining a pairwise three-dimensional (3D) intersection-over-union (IoU) of respective 3D view frustrums of the plurality of images (e.g., for example as described above with respect to FIG. 5). In some cases, the plurality of images can be clustered into a plurality of clusters based on pairwise IoU similarity using spectral clustering. For instance, the plurality of clusters can be the same as or similar to the clusters 532, 534, 536 of FIG. 5.

In some cases, the at least one image is obtained based on randomly sampling a plurality of images included in a particular cluster, wherein each image of the plurality of images included in the particular cluster corresponds to a similar view of the scene. For instance, the at least one image can be obtained based on randomly sampling a plurality of images included in one of the clusters 532, 534, or 536 of FIG. 5. In some examples, obtaining at least one image comprises, for each training epoch of a plurality of training epochs, obtaining at least one image from each respective cluster of the plurality of clusters.

In some cases, the process 1200 can include generating, using a depth estimation machine learning network, an estimated depth map corresponding to the at least one image. For instance, the depth estimation machine learning network can be the same as or similar to the depth estimation machine learning network 422 of FIG. 4 and the estimated depth map can be the same as or similar to the estimated depth map 425 of FIG. 4. In some examples, the estimated depth map includes a pseudo-depth value for each pixel of a plurality of pixels of the at least one image.

In some cases, the process 1200 can include generating, using a surface normal estimation machine learning network, an estimated normal map corresponding to the at least one image. For instance, the surface normal estimation machine learning network can be the same as or similar to the surface normal estimation machine learning network 424 of FIG. 4 and the estimated normal map can be the same as or similar to the estimated normal map 427 of FIG. 4. In some examples, the estimated normal map includes a normal vector for each pixel of a plurality of pixels of the at least one image.

At block 1204, the process 1200 includes generating a planar distance map corresponding to the at least one image, wherein the planar distance map includes a planar distance value for each pixel of a plurality of pixels of the at least one image. For instance, the planar distance map can be the same as or similar to the planar distance map (e.g., D-map) 430 of FIG. 4, the D-map 630*a* or 630*b* of FIG. 6, the D-map 1130 of FIG. 11, etc.

In some examples, generating the planar distance map is based on intrinsic parameter information associated with a camera used to obtain the at least one image, the estimated depth map, and the estimated normal map. In some cases, the planar distance value included in the planar distance map for each pixel is indicative of a planar distance from an origin of the camera in a three-dimensional (3D) coordinate system to a location in the 3D coordinate system corresponding to each pixel. For example, the origin of the camera can be the same as the value o included in the intrinsic, extrinsic, and/or pose information, etc. 452 depicted in FIG. 4 and associated with the camera used to capture the 2D input image 410.

At block 1206, the process 1200 includes performing planar segmentation based on the planar distance map, a normal map corresponding to the at least one image, and positional encoding information associated with the planar distance map. For instance, the planar segmentation can be associated with the planar segmentation information 440 of FIG. 4. In some cases, the planar segmentation associates each pixel of the plurality of pixels with a respective identifier corresponding to a particular planar surface of a plurality of planar surfaces within the at least one image. For instance, the planar segmentation can be the same as the planar segmentation information 440 of FIG. 4. In some examples, the planar segmentation is based on a feature vector comprising the planar distance map, the normal map, and the positional encoding information. In some examples, the planar segmentation is based on mean-shift clustering using the feature vector.

At block 1208, the process 1200 includes initializing a triangular mesh fragment at least in part by sampling one or more points from each planar segment of a plurality of planar segments determined based on the planar segmentation. For instance, the triangular mesh fragment can be the same as or similar to the triangular mesh fragment 450 of FIG. 4, the triangular mesh fragment 750 of FIG. 7, etc. The plurality of planar segments can be included in or determined based on the planar segmentation 440 of FIG. 4. In some examples, sampling the one or more points from each planar segment is based on farthest-point sampling for each planar segment. In some cases, a quantity of sampled points associated with each planar segment is proportional to an area of each planar segment within the at least one image.

In some examples, initializing the triangular mesh fragment further comprises generating a depth-corrected triangular mesh fragment based on performing depth correction of the triangular mesh fragment using at least one learning parameter associated with a bias. For instance, the depth correction can be associated with the depth correction 460 of FIG. 4 and/or the depth correction of FIG. 8. In some cases, the at least one learning parameter includes a first learning parameter associated with a scale bias and a second learning parameter associated with a shift bias.

In some examples, initializing the triangular mesh fragment comprises generating a two-dimensional (2D) triangular mesh using the sampled one or more points as vertices of the 2D triangular mesh. In some cases, a 3D triangular mesh fragment can be generated using a corresponding estimated depth value for each vertex of the 2D triangular mesh and camera pose information (e.g., camera pose information 452 of FIG. 4) associated with the at least one image, wherein the corresponding estimated depth value is a pseudo-depth value included in an estimated depth map (e.g., the estimated depth map 425 of FIG. 4) generated based on the at least one image.

At block 1210, the process 1200 includes determining one or more ray-triangle intersections based on performing ray casting for a reconstructed planar mesh, using a trained planar reconstruction and segmentation machine learning network, wherein the reconstructed planar mesh includes a plurality of triangular mesh fragments, each triangular mesh fragment corresponding to a different image. For instance, the reconstructed planar mesh can be the same as or similar to the depth-corrected planar mesh, such as the depth corrected or displaced mesh 860 of FIG. 8.

In some cases, the reconstructed planar mesh includes a plurality of triangular mesh fragments wherein each triangular mesh fragment of the plurality of triangular mesh fragments corresponds to a different image of the plurality of images. In some examples, the process 1200 can include analyzing, using one or more prediction heads of a multilayer perceptron (MLP) machine learning network, one or more of transparency information, color information, or embedding vector information corresponding to one or more ray-triangle intersections along each ray of a plurality of rays associated with the ray casting. In some cases, the MLP machine learning network can be included in and/or implemented by the rendering engine 470 of FIG. 4. In some cases, alpha composition can be performed to determine an integral of weighted quantities along each ray of the plurality of rays. In some examples, the one or more ray-triangle intersections along each ray are sorted based on a respective distance from a camera origin to each ray-triangle intersection of the one or more ray-triangle intersections. In some examples, alpha composition is performed based on the sorted one or more ray-triangle intersections along each ray.

In some cases, ray casting is performed using explicit geometric rendering. In some cases, the one or more ray-triangle intersections are determined without performing ray marching.

In some examples, the process 1200 further includes optimizing a planar reconstruction and segmentation machine learning network for the scene, based on training the planar reconstruction and segmentation machine learning network using one or more loss functions. For instance, the trained planar reconstruction and segmentation machine learning network can be the same as or similar to the machine learning network 400 of FIG. 4. In some examples, the one or more loss functions can include one or more (or all) of a color rendering loss, a depth-map loss, a normal-map loss, a divergence loss, and a contrastive loss.

The color rendering loss can be associated with the predicted color information 484 of FIG. 4. The depth-map loss can be associated with the predicted depth information 486 of FIG. 4. The normal-map loss can be associated with the normal map information 488 of FIG. 4. The divergence loss and contrastive loss can be associated with the spherical embedding information 490 of FIG. 4.

In some examples, the divergence loss is indicative of a divergence between overlapping triangular mesh fragments included in the reconstructed planar mesh. In some cases, the process 1200 includes minimizing the divergence loss to fuse duplicated mesh surfaces within the reconstructed planar mesh, the duplicated mesh surfaces corresponding to overlapping portions of the overlapping triangular mesh fragments. In some cases, minimizing the divergence loss coherently deforms the overlapping triangular mesh fragments.

In some examples, the contrastive loss is associated with planar instance segmentation of the reconstructed planar mesh, such as planar instance segmentation associated with the spherical embedding 490 of FIG. 4 and used for planar instance segmentation. In some cases, the contrastive loss is based on segmenting planar instances within the reconstructed planar mesh based on the contrastive loss and without using ground truth annotation of the planar instances. In some examples, a spherical embedding is determined that is indicative of the segmented planar instances. For instance, the spherical embedding can be the same as or similar to the spherical embedding 490 of FIG. 4 and/or the spherical embedding 1030 of FIG. 10. In some cases, the contrastive loss can be determined based on the spherical embedding. In some examples, discriminating features of planar instances associated with the spherical embedding can be learned, wherein the discriminating features are learned based on the contrastive loss.

As noted above, the processes described herein (e.g., process 1200 and/or any other process described herein) may be performed by a computing device or apparatus utilizing or implementing a machine learning model (e.g., the machine learning system 400 of FIG. 4, etc.). In one example, the process 1200 can be performed by the electronic device 100 of FIG. 1. In another example, the process 1200 can be performed by the computing system having the computing device architecture of the computing system 1500 shown in FIG. 15. For instance, a computing device with the computing device architecture of the computing system 1500 shown in FIG. 15 can implement the operations of FIG. 12 and/or the components and/or operations described herein with respect to any of FIGS. 3 through 12.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 1200 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
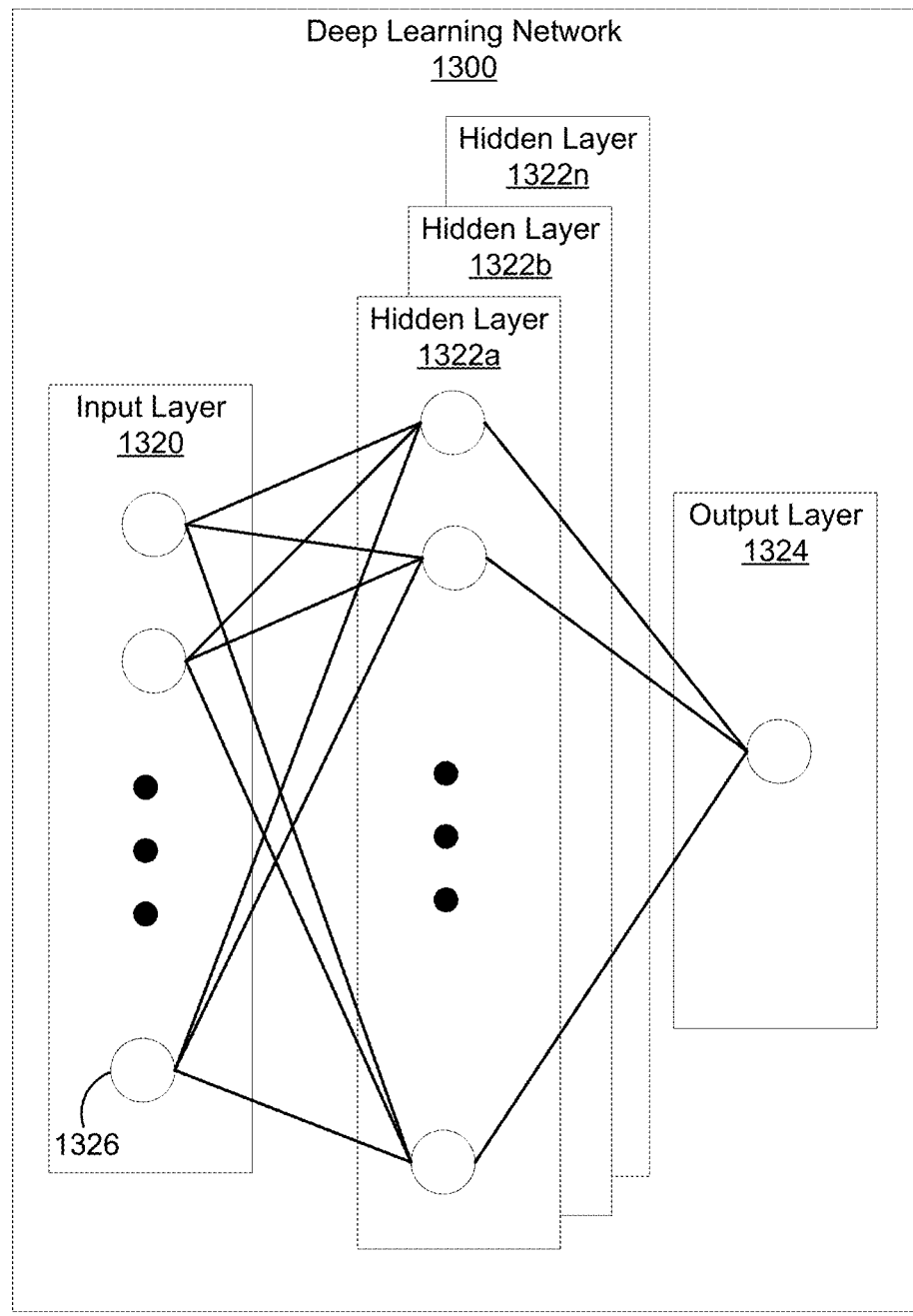
FIG. 13 is a block diagram illustrating an example of a deep learning network, in accordance with some examples.

FIG. 13 is an illustrative example of a deep learning neural network 1300 that can be used by the machine learning model 320 of FIG. 3 and/or the machine learning architecture 400 of FIG. 4. An input layer 1320 includes input data. In one illustrative example, the input layer 1320 can include data representing the pixels of an input video frame. The neural network 1300 includes multiple hidden layers 1322a, 1322b, through 1322n. The hidden layers 1322a, 1322b, through 1322n include "n" number of hidden layers, where "n" is an integer greater than or equal to one. The number of hidden layers can be made to include as many layers as needed for the given application. The neural network 1300 further includes an output layer 1324 that provides an output resulting from the processing performed by the hidden layers 1322a, 1322b, through 1322n. In one illustrative example, the output layer 1324 can provide a classification for an object in an input video frame. The classification can include a class identifying the type of object (e.g., a person, a dog, a cat, or other object).

The neural network 1300 is a multi-layer neural network of interconnected nodes. Each node can represent a piece of information. Information associated with the nodes is shared among the different layers and each layer retains information as information is processed. In some cases, the neural network 1300 can include a feed-forward network, in which case there are no feedback connections where outputs of the network are fed back into itself. In some cases, the neural network 1300 can include a recurrent neural network, which can have loops that allow information to be carried across nodes while reading in input.

Information can be exchanged between nodes through node-to-node interconnections between the various layers. Nodes of the input layer 1320 can activate a set of nodes in the first hidden layer 1322a. For example, as shown, each of the input nodes of the input layer 1320 is connected to each of the nodes of the first hidden layer 1322a. The nodes of the hidden layers 1322a, 1322b, through 1322n can transform the information of each input node by applying activation functions to the information. The information derived from the transformation can then be passed to and can activate the nodes of the next hidden layer 1322b, which can perform their own designated functions. Example functions include convolutional, up-sampling, data transformation, and/or any other suitable functions. The output of the hidden layer 1322b can then activate nodes of the next hidden layer, and so on. The output of the last hidden layer 1322n can activate one or more nodes of the output layer 1324, at which an output is provided. In some cases, while nodes (e.g., node 1326) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. Once the neural network 1300 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1320 using the different hidden layers 1322a, 1322b, through 1322n in order to provide the output through the output layer 1324. In an example in which the neural network 1300 is used to identify objects in images, the neural network 1300 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1300 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1300 is trained well enough so that the weights of the layers are accurately tuned.

For the example of identifying objects in images, the forward pass can include passing a training image through the neural network 1300. The weights are initially randomized before the neural network 1300 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1300 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1300 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and n denotes a learning rate. The learning rate can be set to any suitable value, with a high learning rate including larger weight updates and a lower value indicating smaller weight updates.

The neural network 1300 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 1300 can include any other deep network other than a CNN, such as an autoencoder, a deep belief nets (DBNs), a Recurrent Neural Networks (RNNs), among others.

Figure 14:
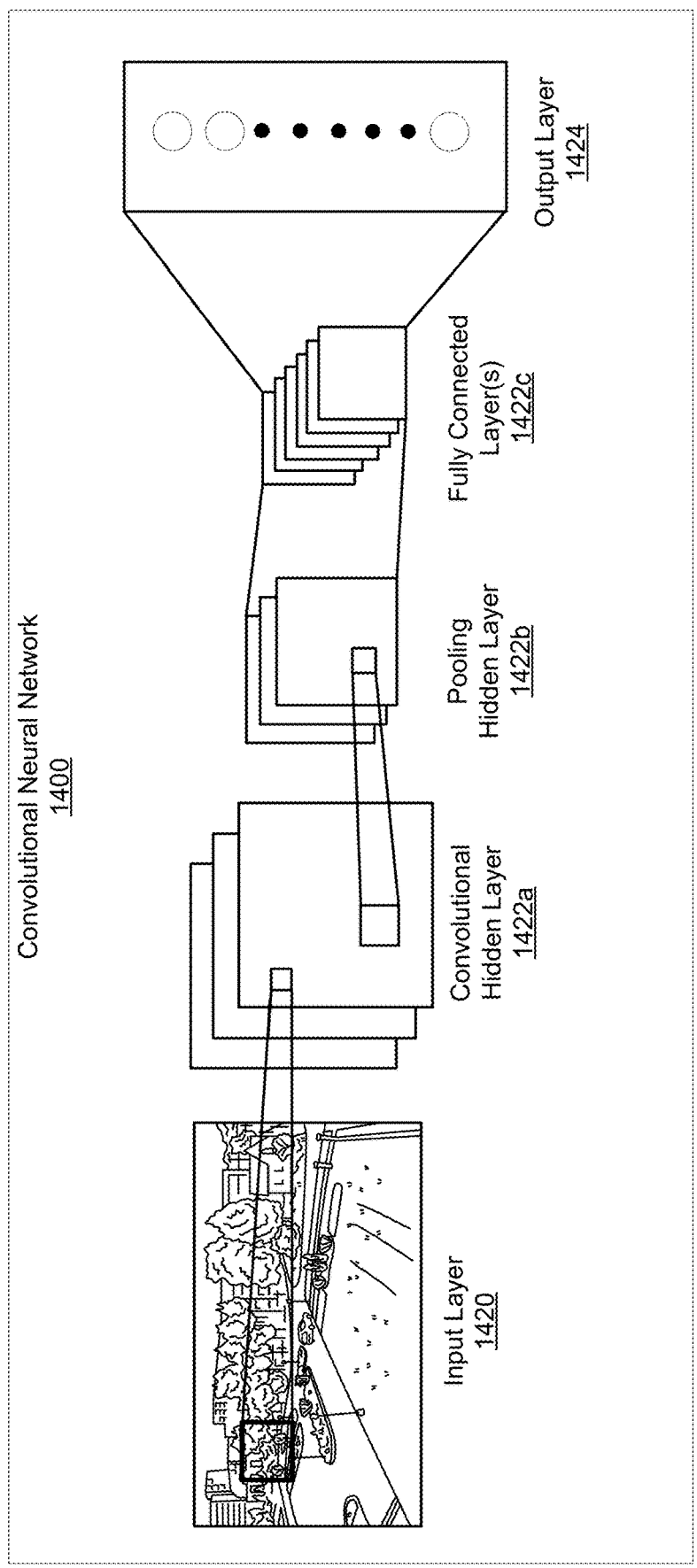
FIG. 14 is a block diagram illustrating an example of a convolutional neural network, in accordance with some examples.

FIG. 14 is an illustrative example of a convolutional neural network 1400 (CNN 1400). The input layer 1420 of the CNN 1400 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1422a, an optional non-linear activation layer, a pooling hidden layer 1422b, and fully connected hidden layers 1422c to get an output at the output layer 1424. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 is the convolutional hidden layer 1422a. The convolutional hidden layer 1422a analyzes the image data of the input layer 1420. Each node of the convolutional hidden layer 1422a is connected to a region of nodes (pixels) of the input image called a receptive field. The convolutional hidden layer 1422a can be considered as one or more filters (each filter corresponding to a different activation or feature map), with each convolutional iteration of a filter being a node or neuron of the convolutional hidden layer 1422a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1422a. Each connection between a node and a receptive field for that node learns a weight and, in some cases, an overall bias such that each node learns to analyze its particular local receptive field in the input image. Each node of the hidden layer 1422a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1422a is due to each node of the convolutional layer being applied to its corresponding receptive field. For example, a filter of the convolutional hidden layer 1422a can begin in the top-left corner of the input image array and can convolve around the input image. As noted above, each convolutional iteration of the filter can be considered a node or neuron of the convolutional hidden layer 1422a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1422a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1422a.

The mapping from the input layer to the convolutional hidden layer 1422a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1422a can include several activation maps in order to identify multiple features in an image. The example shown in FIG. 14 includes three activation maps. Using three activation maps, the convolutional hidden layer 1422a can detect three different kinds of features, with each feature being detectable across the entire image.

In some examples, a non-linear hidden layer can be applied after the convolutional hidden layer 1422a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1400 without affecting the receptive fields of the convolutional hidden layer 1422a.

The pooling hidden layer 1422b can be applied after the convolutional hidden layer 1422a (and after the non-linear hidden layer when used). The pooling hidden layer 1422b is used to simplify the information in the output from the convolutional hidden layer 1422a. For example, the pooling hidden layer 1422b can take each activation map output from the convolutional hidden layer 1422a and generates a condensed activation map (or feature map) using a pooling function. Max-pooling is one example of a function performed by a pooling hidden layer. Other forms of pooling functions be used by the pooling hidden layer 1422a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1422a. In the example shown in FIG. 14, three pooling filters are used for the three activation maps in the convolutional hidden layer 1422a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1422a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1422a having a dimension of 24×24 nodes, the output from the pooling hidden layer 1422b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. The exact positional information can be discarded without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1422b to every one of the output nodes in the output layer 1424. Using the example above, the input layer includes 28×28 nodes encoding the pixel intensities of the input image, the convolutional hidden layer 1422a includes 3×24×24 hidden feature nodes based on application of a 5×5 local receptive field (for the filters) to three activation maps, and the pooling layer 1422b includes a layer of 3×12×12 hidden feature nodes based on application of max-pooling filter to 2×2 regions across each of the three feature maps. Extending this example, the output layer 1424 can include ten output nodes. In such an example, every node of the 3×12×12 pooling hidden layer 1422b is connected to every node of the output layer 1424.

The fully connected layer 1422c can obtain the output of the previous pooling layer 1422b (which should represent the activation maps of high-level features) and determines the features that most correlate to a particular class. For example, the fully connected layer 1422c layer can determine the high-level features that most strongly correlate to a particular class, and can include weights (nodes) for the high-level features. A product can be computed between the weights of the fully connected layer 1422c and the pooling hidden layer 1422b to obtain probabilities for the different classes. For example, if the CNN 1400 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1424 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 15:
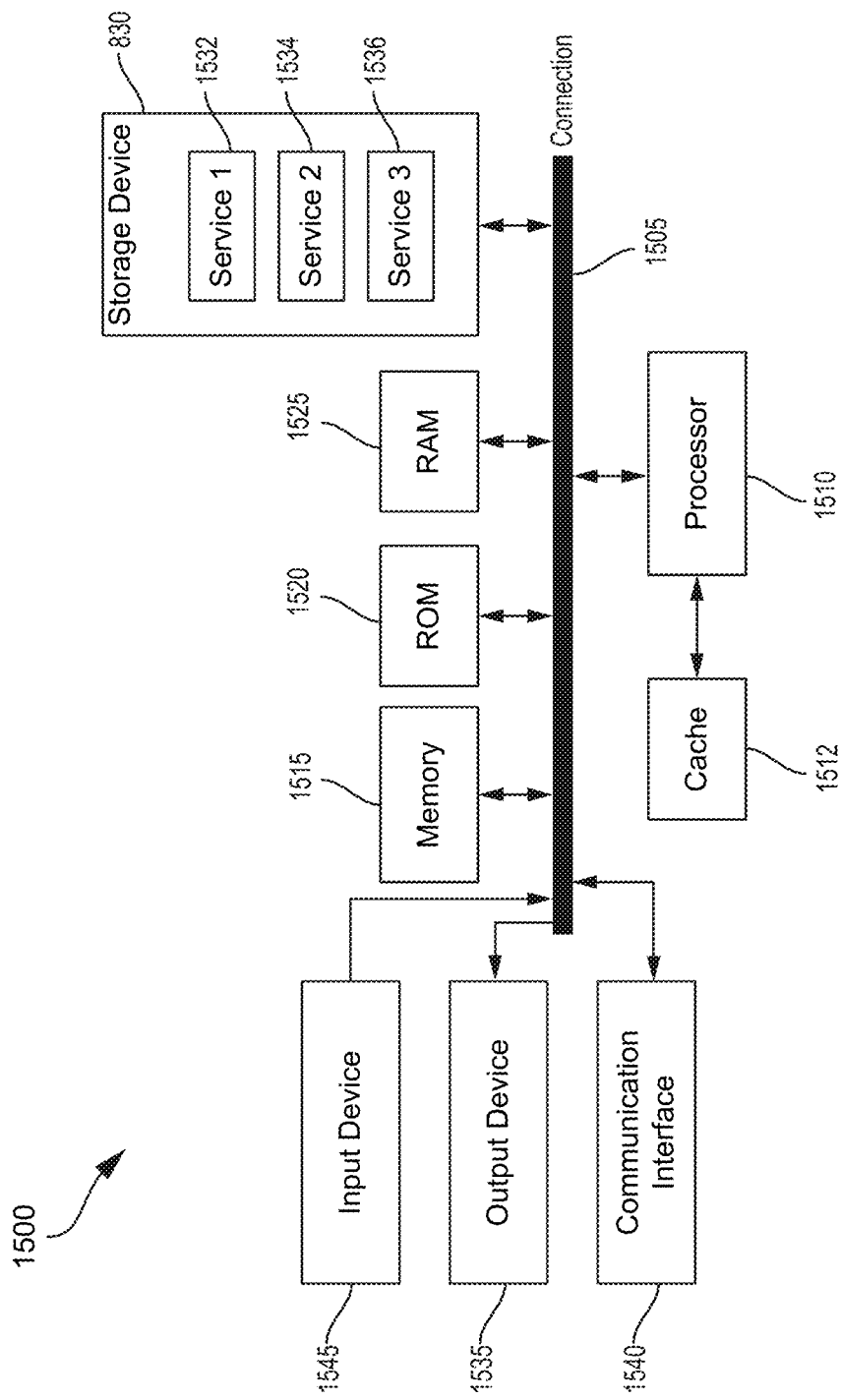
FIG. 15 is a diagram illustrating an example system architecture for implementing certain aspects described herein.

FIG. 15 is a diagram illustrating an example of a system for implementing certain aspects of the present disclosure. In particular, FIG. 15 illustrates an example of computing system 1500, which can be for example any computing device making up a computing system, a camera system, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some examples, computing system 1500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some examples, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus configured to process one or more images, comprising: one or more memories configured to store the one or more images; and one or more processors coupled to the one or more memories, the one or more processors being configured to: obtain at least one image of the one or more images, wherein the at least one image corresponds to a scene; generate a planar distance map corresponding to the at least one image, wherein the planar distance map includes a planar distance value for each pixel of a plurality of pixels of the at least one image; perform planar segmentation based on the planar distance map, a normal map corresponding to the at least one image, and positional encoding information associated with the planar distance map; sample one or more points from each planar segment of a plurality of planar segments to initialize a triangular mesh fragment, wherein the plurality of planar segments are determined based on the planar segmentation; and perform ray casting for a reconstructed planar mesh, based on a trained planar reconstruction and segmentation machine learning network, to determine one or more ray-triangle intersections based on the ray casting, wherein the reconstructed planar mesh includes a plurality of triangular mesh fragments, each triangular mesh fragment corresponding to a different image.

Aspect 2. The apparatus of Aspect 1, wherein the trained planar reconstruction and segmentation machine learning network is based on one or more loss functions, and wherein the one or more of loss functions includes: a color rendering loss, a depth-map loss, a normal-map loss, a divergence loss, and a contrastive loss.

Aspect 3. The apparatus of Aspect 2, wherein the divergence loss is indicative of a divergence between overlapping triangular mesh fragments included in the reconstructed planar mesh.

Aspect 4. The apparatus of Aspect 3, wherein, to minimize the divergence loss, the at least one processor is configured to fuse duplicated mesh surfaces within the reconstructed planar mesh, the duplicated mesh surfaces corresponding to overlapping portions of the overlapping triangular mesh fragments.

Aspect 5. The apparatus of any of Aspects 3 to 4, wherein, to minimize the divergence loss, the at least one processor is configured to coherently deform the overlapping triangular mesh fragments.

Aspect 6. The apparatus of any of Aspects 2 to 5, wherein the contrastive loss is associated with planar instance segmentation of the reconstructed planar mesh.

Aspect 7. The apparatus of Aspect 6, wherein the at least one processor is further configured to segment planar instances within the reconstructed planar mesh based on the contrastive loss and without using ground truth annotation of the planar instances.

Aspect 8. The apparatus of Aspect 7, wherein the at least one processor is further configured to: determine a spherical embedding indicative of the segmented planar instances; and determine the contrastive loss based on the spherical embedding.

Aspect 9. The apparatus of Aspect 8, wherein the at least one processor is further configured to: learn discriminating features of planar instances associated with the spherical embedding, wherein the discriminating features are learned based on the contrastive loss.

Aspect 10. The apparatus of any of Aspects 1 to 9, wherein: the at least one image comprises a plurality of images; and the reconstructed planar mesh includes a plurality of triangular mesh fragments wherein each triangular mesh fragment of the plurality of triangular mesh fragments corresponds to a different image of the plurality of images.

Aspect 11. The apparatus of any of Aspects 1 to 10, wherein the at least one processor is further configured to: analyze, using one or more prediction heads of a multilayer perceptron (MLP) machine learning network, one or more of transparency information, color information, or embedding vector information corresponding to one or more ray-triangle intersections along each ray of a plurality of rays associated with the ray casting.

Aspect 12. The apparatus of Aspect 11, wherein the at least one processor is further configured to perform alpha composition to determine an integral of weighted quantities along each ray of the plurality of rays.

Aspect 13. The apparatus of Aspect 12, wherein the at least one processor is configured to: sort the one or more ray-triangle intersections along each ray based on a respective distance from a camera origin to each ray-triangle intersection of the one or more ray-triangle intersections; and perform alpha composition based on the sorted one or more ray-triangle intersections along each ray.

Aspect 14. The apparatus of any of Aspects 11 to 13, wherein the at least one processor is configured to perform ray casting using explicit geometric rendering.

Aspect 15. The apparatus of any of Aspects 11 to 14, wherein the at least one processor is configured to determine the one or more ray-triangle intersections without performing ray marching.

Aspect 16. The apparatus of any of Aspects 1 to 15, wherein, to initialize the triangular mesh fragment, the at least one processor is further configured to: generate a depth-corrected triangular mesh fragment based on performing depth correction of the triangular mesh fragment using at least one learning parameter associated with a bias.

Aspect 17. The apparatus of Aspect 16, wherein the at least one learning parameter includes a first learning parameter associated with a scale bias and a second learning parameter associated with a shift bias.

Aspect 18. The apparatus of any of Aspects 1 to 17, wherein the at least one processor is configured to sample the one or more points from each planar segment based on farthest-point sampling for each planar segment.

Aspect 19. The apparatus of any of Aspects 1 to 18, wherein a quantity of sampled points associated with each planar segment is proportional to an area of each planar segment within the at least one image.

Aspect 20. The apparatus of any of Aspects 1 to 19, wherein, to initialize the triangular mesh fragment, the at least one processor is configured to generate a two-dimensional (2D) triangular mesh using the sampled one or more points as vertices of the 2D triangular mesh.

Aspect 21. The apparatus of Aspect 20, wherein the at least one processor is further configured to: generate a 3D triangular mesh fragment using a corresponding estimated depth value for each vertex of the 2D triangular mesh and camera pose information associated with the at least one image, wherein the corresponding estimated depth value is a pseudo-depth value included in an estimated depth map generated based on the at least one image.

Aspect 22. The apparatus of any of Aspects 1 to 21, wherein the at least one processor is further configured to: generate, using a depth estimation machine learning network, an estimated depth map corresponding to the at least one image; and generate, using a surface normal estimation machine learning network, an estimated normal map corresponding to the at least one image.

Aspect 23. The apparatus of Aspect 22, wherein: the estimated depth map includes a pseudo-depth value for each pixel of a plurality of pixels of the at least one image; and the estimated normal map includes a normal vector for each pixel of a plurality of pixels of the at least one image.

Aspect 24. The apparatus of any of Aspects 22 to 23, wherein, to generate the planar distance map, the at least one processor is configured to use intrinsic parameter information associated with a camera used to obtain the at least one image, the estimated depth map, and the estimated normal map.

Aspect 25. The apparatus of Aspect 24, wherein the planar distance value included in the planar distance map for each pixel is indicative of a planar distance from an origin of the camera in a three-dimensional (3D) coordinate system to a location in the 3D coordinate system corresponding to each pixel.

Aspect 26. The apparatus of any of Aspects 1 to 25, wherein the planar segmentation associates each pixel of the plurality of pixels with a respective identifier corresponding to a particular planar surface of a plurality of planar surfaces within the at least one image.

Aspect 27. The apparatus of Aspect 26, wherein the planar segmentation is based on a feature vector comprising the planar distance map, the normal map, and the positional encoding information.

Aspect 28. The apparatus of Aspect 27, wherein the planar segmentation is based on mean-shift clustering using the feature vector.

Aspect 29. The apparatus of any of Aspects 1 to 28, wherein, to obtain the at least one image, the at least one processor is configured to: obtain a plurality of images of the scene using a monocular moving camera associated with the scene; determine a pairwise three-dimensional (3D) intersection-over-union (IoU) of respective 3D view frustrums of the plurality of images; and cluster the plurality of images into a plurality of clusters based on pairwise IoU similarity using spectral clustering.

Aspect 30. The apparatus of Aspect 29, wherein the at least one processor is configured to obtain the at least one image based on randomly sampling a plurality of images included in a particular cluster, and wherein each image of the plurality of images included in the particular cluster corresponds to a similar view of the scene.

Aspect 31. The apparatus of Aspect 30, wherein, to obtain at least one image, the at least one processor is configured to obtain, for each training epoch of a plurality of training epochs, at least one image from each respective cluster of the plurality of clusters.

Aspect 32. The apparatus of any of Aspects 1 to 31, wherein of the trained planar reconstructions and segmentation machine learning network is trained based on one or more loss functions, and wherein the one or more loss functions includes a divergence loss indicative of a divergence between overlapping triangular mesh fragments included in the reconstructed planar mesh.

Aspect 33. The apparatus of Aspect 32, wherein the one or more processors are configured to train the planar reconstruction and segmentation machine learning network based on the one or more loss functions, and wherein to train the planar reconstruction and segmentation machine learning network, the one or more processors are configured to coherently deform the overlapping triangular mesh fragments to minimize the divergence loss, or to fuse duplicated mesh surfaces within the reconstructed planar mesh to minimize the divergence loss, the duplicated mesh surfaces corresponding to overlapping portions of the overlapping triangular mesh fragments.

Aspect 34. The apparatus of any of Aspects 1 to 34, wherein: the one or more loss functions includes a contrastive loss associated with planar instance segmentation of the reconstructed planar mesh; and the one or more processors are further configured to segment planar instances within the reconstructed planar mesh based on the contrastive loss and without using ground truth annotation of the planar instances.

Aspect 35. The apparatus of Aspect 34, wherein the one or more processors are further configured to: determine a spherical embedding indicative of the segmented planar instances; and determine the contrastive loss based on the spherical embedding.

Aspect 36. The apparatus of any of Aspects 1 to 35, wherein: the at least one image comprises a plurality of images; and the reconstructed planar mesh includes a plurality of triangular mesh fragments wherein each triangular mesh fragment of the plurality of triangular mesh fragments corresponds to a different image of the plurality of images.

Aspect 37. The apparatus of any of Aspects 1 to 36, wherein the one or more processors are further configured to: analyze, using one or more prediction heads of a multilayer perceptron (MLP) machine learning network, one or more of transparency information, color information, or embedding vector information corresponding to one or more ray-triangle intersections along each ray of a plurality of rays associated with the ray casting.

Aspect 38. The apparatus of Aspect 37, wherein the one or more processors are further configured to perform alpha composition to determine an integral of weighted quantities along each ray of the plurality of rays.

Aspect 39. The apparatus of Aspect 38, wherein the one or more processors are configured to: sort the one or more ray-triangle intersections along each ray based on a respective distance from a camera origin to each ray-triangle intersection of the one or more ray-triangle intersections; and perform alpha composition based on the sorted one or more ray-triangle intersections along each ray.

Aspect 40. The apparatus of any of Aspects 37 to 39, wherein the one or more processors are configured to perform ray casting using explicit geometric rendering.

Aspect 41. The apparatus of any of Aspects 37 to 40, wherein the one or more processors are configured to determine the one or more ray-triangle intersections without performing ray marching.

Aspect 42. The apparatus of any of Aspects 1 to 41, wherein, to initialize the triangular mesh fragment, the one or more processors are further configured to: perform depth correction of the triangular mesh fragment using at least one learning parameter associated with a bias to generate a depth-corrected triangular mesh fragment.

Aspect 43. The apparatus of Aspect 42, wherein the at least one learning parameter includes a first learning parameter associated with a scale bias and a second learning parameter associated with a shift bias.

Aspect 44. The apparatus of any of Aspects 1 to 43, wherein the one or more processors are configured to sample the one or more points from each planar segment based on farthest-point sampling for each planar segment.

Aspect 45. The apparatus of any of Aspects 1 to 44, wherein a quantity of sampled points associated with each planar segment is proportional to an area of each planar segment within the at least one image.

Aspect 46. The apparatus of any of Aspects 1 to 45, wherein, to initialize the triangular mesh fragment, the one or more processors are configured to generate a two-dimensional (2D) triangular mesh using the sampled one or more points as vertices of the 2D triangular mesh.

Aspect 47. The apparatus of Aspect 46, wherein the one or more processors are further configured to: generate a 3D triangular mesh fragment using a corresponding estimated depth value for each vertex of the 2D triangular mesh and camera pose information associated with the at least one image, wherein the corresponding estimated depth value is a pseudo-depth value included in an estimated depth map generated based on the at least one image.

Aspect 48. The apparatus of any of Aspects 1 to 47, wherein the one or more processors are further configured to: generate, using a depth estimation machine learning network, an estimated depth map corresponding to the at least one image; and generate, using a surface normal estimation machine learning network, an estimated normal map corresponding to the at least one image.

Aspect 49. The apparatus of Aspect 48, wherein: the estimated depth map includes a pseudo-depth value for each pixel of a plurality of pixels of the at least one image; and the estimated normal map includes a normal vector for each pixel of a plurality of pixels of the at least one image.

Aspect 50. The apparatus of any of Aspects 48 to 49, wherein, to generate the planar distance map, the one or more processors are configured to use intrinsic parameter information associated with a camera used to obtain the at least one image, the estimated depth map, and the estimated normal map.

Aspect 51. The apparatus of Aspect 50, wherein the planar distance value included in the planar distance map for each pixel is indicative of a planar distance from an origin of the camera in a three-dimensional (3D) coordinate system to a location in the 3D coordinate system corresponding to each pixel.

Aspect 52. The apparatus of any of Aspects 1 to 51, wherein the planar segmentation associates each pixel of the plurality of pixels with a respective identifier corresponding to a particular planar surface of a plurality of planar surfaces within the at least one image.

Aspect 53. The apparatus of Aspect 52, wherein the planar segmentation is based on a feature vector comprising the planar distance map, the normal map, and the positional encoding information.

Aspect 54. The apparatus of Aspect 53, wherein the planar segmentation is based on mean-shift clustering using the feature vector.

Aspect 55. The apparatus of any of Aspects 1 to 54, wherein, to obtain the at least one image, the one or more processors are configured to: obtain a plurality of images of the scene using a monocular moving camera associated with the scene; determine a pairwise three-dimensional (3D) intersection-over-union (IoU) of respective 3D view frustrums of the plurality of images; and cluster the plurality of images into a plurality of clusters based on pairwise IoU similarity using spectral clustering.

Aspect 56. The apparatus of Aspect 55, wherein, to obtain the at least one image, the one or more processors are configured to randomly sample a plurality of images included in a particular cluster, and wherein each image of the plurality of images included in the particular cluster corresponds to a similar view of the scene.

Aspect 57. The apparatus of Aspect 56, wherein, to obtain at least one image, the one or more processors are configured to obtain, for each training epoch of a plurality of training epochs, at least one image from each respective cluster of the plurality of clusters.

Aspect 58. A processor-implemented method for processing image data corresponding to a scene, comprising: obtaining at least one image corresponding to the scene; generating a planar distance map corresponding to the at least one image, wherein the planar distance map includes a planar distance value for each pixel of a plurality of pixels of the at least one image; performing planar segmentation based on the planar distance map, a normal map corresponding to the at least one image, and positional encoding information associated with the planar distance map; initializing a triangular mesh fragment at least in part by sampling one or more points from each planar segment of a plurality of planar segments determined based on the planar segmentation; determining one or more ray-triangle intersections based on performing ray casting for a reconstructed planar mesh, wherein the reconstructed planar mesh includes a plurality of triangular mesh fragments, each triangular mesh fragment corresponding to a different image; and optimizing a trained planar reconstruction and segmentation machine learning network for the scene based on one or more loss functions.

Aspect 59. The processor-implemented method of Aspect 58, wherein the one or more loss functions includes: a color rendering loss, a depth-map loss, a normal-map loss, a divergence loss, and a contrastive loss.

Aspect 60. The processor-implemented method of Aspect 59, wherein the divergence loss is indicative of a divergence between overlapping triangular mesh fragments included in the reconstructed planar mesh.

Aspect 61. The processor-implemented method of Aspect 60, wherein minimizing the divergence loss fuses duplicated mesh surfaces within the reconstructed planar mesh, the duplicated mesh surfaces corresponding to overlapping portions of the overlapping triangular mesh fragments.

Aspect 62. The processor-implemented method of any of Aspects 60 to 61, wherein minimizing the divergence loss coherently deforms the overlapping triangular mesh fragments.

Aspect 63. The processor-implemented method of any of Aspects 59 to 62, wherein the contrastive loss is associated with planar instance segmentation of the reconstructed planar mesh.

Aspect 64. The processor-implemented method of Aspect 63, further comprising segmenting planar instances within the reconstructed planar mesh based on the contrastive loss and without using ground truth annotation of the planar instances.

Aspect 65. The processor-implemented method of Aspect 64, further comprising: determining a spherical embedding indicative of the segmented planar instances; and determining the contrastive loss based on the spherical embedding.

Aspect 66. The processor-implemented method of Aspect 65, further comprising: learning discriminating features of planar instances associated with the spherical embedding, wherein the discriminating features are learned based on the contrastive loss.

Aspect 67. The processor-implemented method of any of Aspects 58 to 66, wherein: the at least one image comprises a plurality of images; and the reconstructed planar mesh includes a plurality of triangular mesh fragments wherein each triangular mesh fragment of the plurality of triangular mesh fragments corresponds to a different image of the plurality of images.

Aspect 68. The processor-implemented method of any of Aspects 58 to 67, further comprising: analyzing, using one or more prediction heads of a multilayer perceptron (MLP) machine learning network, one or more of transparency information, color information, or embedding vector information corresponding to one or more ray-triangle intersections along each ray of a plurality of rays associated with the ray casting.

Aspect 69. The processor-implemented method of Aspect 68, further comprising performing alpha composition to determine an integral of weighted quantities along each ray of the plurality of rays.

Aspect 70. The processor-implemented method of Aspect 69, wherein: the one or more ray-triangle intersections along each ray are sorted based on a respective distance from a camera origin to each ray-triangle intersection of the one or more ray-triangle intersections; and alpha composition is performed based on the sorted one or more ray-triangle intersections along each ray.

Aspect 71. The processor-implemented method of any of Aspects 68 to 70, wherein ray casting is performed using explicit geometric rendering.

Aspect 72. The processor-implemented method of any of Aspects 68 to 71, wherein the one or more ray-triangle intersections are determined without performing ray marching.

Aspect 73. The processor-implemented method of any of Aspects 58 to 72, wherein initializing the triangular mesh fragment further comprises: generating a depth-corrected triangular mesh fragment based on performing depth correction of the triangular mesh fragment using at least one learning parameter associated with a bias.

Aspect 74. The processor-implemented method of Aspect 73, wherein the at least one learning parameter includes a first learning parameter associated with a scale bias and a second learning parameter associated with a shift bias.

Aspect 75. The processor-implemented method of any of Aspects 58 to 74, wherein sampling the one or more points from each planar segment is based on farthest-point sampling for each planar segment.

Aspect 76. The processor-implemented method of any of Aspects 58 to 75, wherein a quantity of sampled points associated with each planar segment is proportional to an area of each planar segment within the at least one image.

Aspect 77. The processor-implemented method of any of Aspects 58 to 76, wherein initializing the triangular mesh fragment comprises generating a two-dimensional (2D) triangular mesh using the sampled one or more points as vertices of the 2D triangular mesh.

Aspect 78. The processor-implemented method of Aspect 77, further comprising generating a 3D triangular mesh fragment using a corresponding estimated depth value for each vertex of the 2D triangular mesh and camera pose information associated with the at least one image, wherein the corresponding estimated depth value is a pseudo-depth value included in an estimated depth map generated based on the at least one image.

Aspect 79. The processor-implemented method of any of Aspects 58 to 78, further comprising: generating, using a depth estimation machine learning network, an estimated depth map corresponding to the at least one image; and generating, using a surface normal estimation machine learning network, an estimated normal map corresponding to the at least one image.

Aspect 80. The processor-implemented method of Aspect 79, wherein: the estimated depth map includes a pseudo-depth value for each pixel of a plurality of pixels of the at least one image; and the estimated normal map includes a normal vector for each pixel of a plurality of pixels of the at least one image.

Aspect 81. The processor-implemented method of any of Aspects 79 to 80, wherein generating the planar distance map is based on intrinsic parameter information associated with a camera used to obtain the at least one image, the estimated depth map, and the estimated normal map.

Aspect 82. The processor-implemented method of Aspect 81, wherein the planar distance value included in the planar distance map for each pixel is indicative of a planar distance from an origin of the camera in a three-dimensional (3D) coordinate system to a location in the 3D coordinate system corresponding to each pixel.

Aspect 83. The processor-implemented method of any of Aspects 58 to 82, wherein the planar segmentation associates each pixel of the plurality of pixels with a respective identifier corresponding to a particular planar surface of a plurality of planar surfaces within the at least one image.

Aspect 84. The processor-implemented method of Aspect 83, wherein the planar segmentation is based on a feature vector comprising the planar distance map, the normal map, and the positional encoding information.

Aspect 85. The processor-implemented method of Aspect 84, wherein the planar segmentation is based on mean-shift clustering using the feature vector.

Aspect 86. The processor-implemented method of any of Aspects 58 to 85, wherein obtaining the at least one image comprises: obtaining a plurality of images of the scene using a monocular moving camera associated with the scene; determining a pairwise three-dimensional (3D) intersection-over-union (IoU) of respective 3D view frustrums of the plurality of images; and clustering the plurality of images into a plurality of clusters based on pairwise IoU similarity using spectral clustering.

Aspect 87. The processor-implemented method of Aspect 86, wherein the at least one image is obtained based on randomly sampling a plurality of images included in a particular cluster, and wherein each image of the plurality of images included in the particular cluster corresponds to a similar view of the scene.

Aspect 88. The processor-implemented method of Aspect 87, wherein obtaining at least one image comprises, for each training epoch of a plurality of training epochs, obtaining at least one image from each respective cluster of the plurality of clusters.

Aspect 89. The processor-implemented method of any of Aspects 58 to 88, wherein the one or more loss functions includes: a color rendering loss, a depth-map loss, a normal-map loss, a divergence loss, and a contrastive loss, wherein: the contrastive loss is associated with planar instance segmentation of the reconstructed planar mesh; the divergence loss is indicative of a divergence between overlapping triangular mesh fragments included in the reconstructed planar mesh; and training the planar reconstruction and segmentation machine learning network includes minimizing the divergence loss to: fuse duplicated mesh surfaces within the reconstructed planar mesh, the duplicated mesh surfaces corresponding to overlapping portions of the overlapping triangular mesh fragments; or coherently deform the overlapping triangular mesh fragments.

Aspect 90. A non-transitory computer-readable storage medium comprising instructions stored thereon which, when executed by at least one processor, causes the at least one processor to perform operations according to any one of Aspects 1 to 57.

Aspect 91. A non-transitory computer-readable storage medium comprising instructions stored thereon which, when executed by at least one processor, causes the at least one processor to perform operations according to any one of Aspects 58 to 89.

Aspect 92. An apparatus for processing image data, comprising one or more means for performing operations according to any one of Aspects 1 to 57.

Aspect 93. An apparatus for processing image data, comprising one or more means for performing operations according to any one of Aspects 58 to 89.

Aspect 94. A processor-implemented method comprising performing operations according to any of Aspects 1 to 57.

Aspect 95. The apparatus of any one of Aspects 1 to 57, further comprising one or more cameras configured to capture the one or more images as posed monocular video or as monocular images each associated with a respective camera pose or camera location.

Aspect 96. The apparatus of any one of Aspects 1 to 57, further comprising a display configured to output the reconstructed planar mesh based on rendering the plurality of triangular mesh fragments determined from the one or more ray-triangle intersections.

What is claimed is:

1. An apparatus configured to process one or more images, comprising:
one or more memories configured to store the one or more images; and
one or more processors coupled to the one or more memories, the one or more processors being configured to:
obtain a set of sampled images from a plurality of images of a scene based on view similarity information, wherein the plurality of images corresponds to multiple spatial views of the scene, and wherein each image of the set of sampled images corresponds to a respective spatial view of the scene;
generate a planar distance map corresponding to each respective image of the set of sampled images, wherein the planar distance map includes a planar distance value for each pixel of a plurality of pixels of the respective image;

determine planar segmentation information indicative of a plurality of planar segments associated with each respective spatial view of the scene, wherein the planar segmentation information is determined for each respective spatial view based on a planar segmentation using the planar distance map, a normal map, and positional encoding information associated with the planar distance map corresponding to the respective spatial view;

generate, based on the planar segmentation information, a corresponding triangular mesh fragment for each respective spatial view, wherein the corresponding triangular mesh fragment is generated based on using one or more points sampled from each planar segment of the plurality of planar segments associated with the respective spatial view for the corresponding triangular mesh fragment for the respective spatial view; and perform ray casting for a reconstructed planar mesh of a plurality of triangular mesh fragments including the corresponding triangular mesh fragment for each respective spatial view, based on a trained planar reconstruction and segmentation machine learning network, to determine one or more ray-triangle intersections based on the ray casting.

2. The apparatus of claim 1, wherein the trained planar reconstruction and segmentation machine learning network is based on one or more loss functions, and wherein the one or more loss functions includes a divergence loss indicative of a divergence between overlapping triangular mesh fragments of the plurality of triangular mesh fragments included in the reconstructed planar mesh.

3. The apparatus of claim 2, wherein the one or more processors are configured to train the planar reconstruction and segmentation machine learning network, and wherein to train the planar reconstruction and segmentation machine learning network, the one or more processors are configured to coherently deform the overlapping triangular mesh fragments to minimize the divergence loss, or to fuse duplicated mesh surfaces within the reconstructed planar mesh to minimize the divergence loss, the duplicated mesh surfaces corresponding to overlapping portions of the overlapping triangular mesh fragments.

4. The apparatus of claim 2, wherein:
the one or more loss functions includes a contrastive loss associated with planar instance segmentation of the reconstructed planar mesh; and
the one or more processors are further configured to segment planar instances within the reconstructed planar mesh based on the contrastive loss and without using ground truth annotation of the planar instances.

5. The apparatus of claim 4, wherein the one or more processors are further configured to:
determine a spherical embedding indicative of the segmented planar instances; and
determine the contrastive loss based on the spherical embedding.

6. The apparatus of claim 1, wherein:
each triangular mesh fragment of the plurality of triangular mesh fragments corresponds to a different image of the set of sampled images, and corresponds to a different spatial view of the multiple spatial views of the scene.

7. The apparatus of claim 1, wherein the one or more processors are further configured to:
analyze, using one or more prediction heads of a multi-layer perceptron (MLP) machine learning network, one or more of transparency information, color information, or embedding vector information corresponding to one or more ray-triangle intersections along each ray of a plurality of rays associated with the ray casting.

8. The apparatus of claim 7, wherein the one or more processors are further configured to perform alpha composition to determine an integral of weighted quantities along each ray of the plurality of rays.

9. The apparatus of claim 8, wherein the one or more processors are configured to:
sort the one or more ray-triangle intersections along each ray based on a respective distance from a camera origin to each ray-triangle intersection of the one or more ray-triangle intersections; and
perform alpha composition based on the sorted one or more ray-triangle intersections along each ray.

10. The apparatus of claim 7, wherein the one or more processors are configured to perform ray casting using explicit geometric rendering.

11. The apparatus of claim 7, wherein the one or more processors are configured to determine the one or more ray-triangle intersections without performing ray marching.

12. The apparatus of claim 1, wherein, to initialize the corresponding triangular mesh fragment for each respective spatial view of the set of sampled images, the one or more processors are further configured to:
perform depth correction of the corresponding triangular mesh fragment using at least one learning parameter associated with a bias to generate a depth-corrected triangular mesh fragment.

13. The apparatus of claim 12, wherein the at least one learning parameter includes a first learning parameter associated with a scale bias and a second learning parameter associated with a shift bias.

14. The apparatus of claim 1, wherein the one or more processors are configured to sample the one or more points from each planar segment based on farthest-point sampling for each planar segment.

15. The apparatus of claim 1, wherein a quantity of the one or more points sampled from each planar segment of the plurality of planar segments associated with the respective spatial view is proportional to an area of the respective planar segment from which the one or more points are sampled.

16. The apparatus of claim 1, wherein, to initialize the corresponding triangular mesh fragment, the one or more processors are configured to generate a two-dimensional (2D) triangular mesh using the one or more points sampled form each planar segment of the plurality of planar segments associated with the respective spatial view as vertices of the 2D triangular mesh.

17. The apparatus of claim 16, wherein the one or more processors are further configured to:
generate a 3D triangular mesh fragment using a corresponding estimated depth value for each vertex of the 2D triangular mesh and camera pose information associated with the respective spatial view, wherein the corresponding estimated depth value is a pseudo-depth value included in an estimated depth map generated based on the respective spatial view.

18. The apparatus of claim 1, wherein the one or more processors are further configured to:
generate, using a depth estimation machine learning network, an estimated depth map corresponding to the respective spatial view; and generate, using a surface normal estimation machine learning network, an estimated normal map corresponding to the respective spatial view.

19. The apparatus of claim 18, wherein:
the estimated depth map includes a pseudo-depth value for each pixel of a plurality of pixels of the plurality of images; and
the estimated normal map includes a normal vector for each pixel of a plurality of pixels of the plurality of images.

20. The apparatus of claim 18, wherein, to generate the planar distance map, the one or more processors are configured to use intrinsic parameter information associated with a camera used to obtain the respective spatial view, the estimated depth map, and the estimated normal map.

21. The apparatus of claim 20, wherein the planar distance value included in the planar distance map for each pixel is indicative of a planar distance from an origin of the camera in a three-dimensional (3D) coordinate system to a location in the 3D coordinate system corresponding to each pixel.

22. The apparatus of claim 1, wherein the planar segmentation associates each pixel of the plurality of pixels with a respective identifier corresponding to a particular planar surface of a plurality of planar surfaces within the respective spatial view.

23. The apparatus of claim 22, wherein the planar segmentation is based on a feature vector comprising the planar distance map, the normal map, and the positional encoding information.

24. The apparatus of claim 23, wherein the planar segmentation is based on mean-shift clustering using the feature vector.

25. The apparatus of claim 1, wherein, to obtain the set of sampled images from the plurality of images, the one or more processors are configured to:
obtain the plurality of images of the scene using a monocular moving camera associated with the scene;
determine a pairwise three-dimensional (3D) intersection-over-union (IoU) of respective 3D view frustrums of the plurality of images; and
cluster the plurality of images into a plurality of clusters based on pairwise IoU similarity using spectral clustering.

26. The apparatus of claim 25, wherein, to obtain the set of sampled images from the plurality of images, the one or more processors are configured to randomly sample a plurality of images included in a particular cluster, and wherein each image of the plurality of images included in the particular cluster corresponds to a similar view of the scene.

27. The apparatus of claim 26, wherein, to obtain the set of sampled images from the plurality of images, the one or more processors are configured to obtain, for each training epoch of a plurality of training epochs, at least one image from each respective cluster of the plurality of clusters.

28. The apparatus of claim 1, further comprising:
one or more cameras configured to capture the one or more images as posed monocular video or as monocular images each associated with a respective camera pose or camera location.

29. The apparatus of claim 1, further comprising:
a display configured to output the reconstructed planar mesh based on rendering the plurality of triangular mesh fragments determined from the one or more ray-triangle intersections.

30. A processor-implemented method for processing image data corresponding to a scene, comprising:
obtaining a set of sampled images from a plurality of images of a scene based on view similarity information, wherein the plurality of images corresponds to multiple spatial views of the scene, and wherein each image of the set of sampled images corresponds to a respective spatial view of the scene;
generating a planar distance map corresponding to each respective image of the set of sampled images, wherein the planar distance map includes a planar distance value for each pixel of a plurality of pixels of the respective image;
determine planar segmentation information indicative of a plurality of planar segments associated with each respective spatial view of the scene, wherein the planar segmentation information is determined for each respective spatial view based on a planar segmentation using the planar distance map, a normal map, and positional encoding information associated with the planar distance map corresponding to the respective spatial view;
generating, based on the planar segmentation information, a corresponding triangular mesh fragment for each respective spatial view, wherein the corresponding triangular mesh fragment is generated based on using one or more points sampled from each planar segment of the plurality of planar segments associated with the respective spatial view for the corresponding triangular mesh fragment for the respective spatial view; and
performing ray casting for a reconstructed planar mesh of a plurality of triangular mesh fragments including the corresponding triangular mesh fragment for each respective spatial view, based on a trained planar reconstruction and segmentation machine learning network, to determine one or more ray-triangle intersections based on the ray casting.

* * * * *